United States Patent
Spurgeon et al.

(10) Patent No.: US 9,366,790 B2
(45) Date of Patent: Jun. 14, 2016

(54) RETROREFLECTIVE ARTICLES HAVING COMPOSITE CUBE-CORNERS AND METHODS OF MAKING

(75) Inventors: Kathryn M. Spurgeon, River Falls, WI (US); Olester Benson, Jr., Woodbury, MN (US); Randy S. Bay, Woodbury, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 98 days.

(21) Appl. No.: 14/005,608

(22) PCT Filed: May 23, 2012

(86) PCT No.: PCT/US2012/039024
§ 371 (c)(1),
(2), (4) Date: Sep. 17, 2013

(87) PCT Pub. No.: WO2012/166448
PCT Pub. Date: Dec. 6, 2012

(65) Prior Publication Data
US 2014/0078586 A1      Mar. 20, 2014

Related U.S. Application Data

(60) Provisional application No. 61/491,554, filed on May 31, 2011.

(51) Int. Cl.
*G02B 5/124* (2006.01)
*B29D 11/00* (2006.01)

(52) U.S. Cl.
CPC ............ *G02B 5/124* (2013.01); *B29D 11/0073* (2013.01)

(58) Field of Classification Search
CPC .......................................... G02B 5/124
USPC .................... 359/529–553; 264/1.9
See application file for complete search history.

(56) References Cited

U.S. PATENT DOCUMENTS 3,469,898 A    9/1969 Altman
3,689,346 A    9/1972 Rowland
(Continued)

FOREIGN PATENT DOCUMENTS

WO    WO 96-30786    10/1996
WO    WO 02-34855    5/2002
(Continued)

OTHER PUBLICATIONS

Light-emitting diode—from Wikipedia, the free encyclopedia, [on line], [retrieved from internet on Nov. 8, 2013], URL:< http://en.wikipedia.org/wiki/Light-emitting_diode>, 36 pages.
(Continued)

*Primary Examiner* — Ricky Mack
*Assistant Examiner* — Mustak Choudhury
(74) *Attorney, Agent, or Firm* — Trisha D. Adamson

(57) ABSTRACT

Retroreflective articles and methods of making the same, wherein the retroreflective articles (10) include composite cube-corner elements (12) having a first light transmissive polymeric layer (30), a second light transmissive polymeric layer (32), and an interface therebetween, wherein the first light transmissive polymeric layer has a first index of refraction, the second light transmissive polymeric layer has a second index of refraction, and the first and second indices of refraction have an absolute difference of at least 0.0002.

16 Claims, 9 Drawing Sheets

(56) References Cited

U.S. PATENT DOCUMENTS

| | | | |
|---|---|---|---|
| 3,811,983 | A | 5/1974 | Rowland |
| 4,332,847 | A | 6/1982 | Rowland |
| 4,576,850 | A | 3/1986 | Martens |
| 4,588,258 | A | 5/1986 | Hoopman |
| 4,601,861 | A | 7/1986 | Pricone |
| 4,775,219 | A | 10/1988 | Appeldorn |
| 4,877,717 | A | 10/1989 | Suzuki |
| 4,895,428 | A | 1/1990 | Nelson |
| 4,938,563 | A | 7/1990 | Nelson |
| 5,138,488 | A | 8/1992 | Szczech |
| 5,450,235 | A | 9/1995 | Smith |
| 5,491,586 | A | 2/1996 | Phillips |
| 5,600,484 | A | 2/1997 | Benson |
| 5,642,222 | A | 6/1997 | Phillips |
| 5,691,846 | A | 11/1997 | Benson, Jr. |
| 5,763,049 | A | 6/1998 | Frey |
| 5,784,197 | A | 7/1998 | Frey |
| 6,120,636 | A * | 9/2000 | Nilsen et al. .................. 156/230 |
| 6,200,399 | B1 | 3/2001 | Thielman |
| 6,257,860 | B1 | 7/2001 | Luttrell |
| 6,318,867 | B1 | 11/2001 | Bacon, Jr. |
| 7,156,527 | B2 | 1/2007 | Smith |
| 7,188,960 | B2 * | 3/2007 | Smith ........................... 359/529 |
| 7,406,239 | B2 | 7/2008 | Ouderkirk |
| 7,410,604 | B2 | 8/2008 | Erickson |
| 7,442,442 | B2 | 10/2008 | Strobel |
| 7,556,386 | B2 | 7/2009 | Smith |
| 7,611,251 | B2 | 11/2009 | Thakkar |
| 7,862,187 | B2 | 1/2011 | Thakkar |
| 2007/0099478 | A1 | 5/2007 | Petersen |

FOREIGN PATENT DOCUMENTS

| | | |
|---|---|---|
| WO | WO 2010-048416 | 4/2010 |
| WO | WO 2012-166447 | 6/2012 |

OTHER PUBLICATIONS

International Search Report for PCT International Application No. PCT/US2012/039024, Mailed on Sep. 3, 2012, 4 pages.

* cited by examiner

RETROREFLECTIVE ARTICLES HAVING COMPOSITE CUBE-CORNERS AND METHODS OF MAKING

CROSS REFERENCE TO RELATED APPLICATIONS

This application is a national stage filing under 35 U.S.C. 371 of PCT/US2012/039024, filed May 23, 2012, which claims priority to U.S. Provisional Patent Application No. 61/491554, filed May 31, 2011, the disclosure of which are incorporated by reference in their entirety herein.

BACKGROUND

Retroreflective materials have the ability to redirect light incident on the material back toward the originating light source. This property has led to the widespread use of retroreflective sheeting for a variety of traffic and personal safety uses. Retroreflective sheeting is commonly employed in a variety of articles (e.g., road signs, barricades, license plates, pavement markers, and pavement marking tape, as well as retroreflective tapes for vehicles and clothing).

There are generally two types of retroreflective sheeting: beaded sheeting and cube-corner sheeting. Beaded sheeting typically employs a multitude of glass or ceramic microspheres to retroreflect incident light. Cube-corner sheeting, on the other hand, typically employs a multitude of rigid, interconnected, cube-corner elements to retroreflect incident light. Cube-corner retroreflective sheeting, sometimes referred to as "prismatic" sheeting, typically comprises a thin transparent layer having a substantially planar first surface and a second structured surface comprising a plurality of geometric structures. In truncated cube-corner sheeting some or all geometric structures include three reflective faces configured as a cube-corner element.

The base edges of adjacent cube-corner elements of truncated cube-corner arrays are typically coplanar. Other cube-corner element structures, described as "full cubes" or "preferred geometry" typically comprise at least two non-dihedral edges that are not coplanar. Such structures typically exhibit a higher total light return in comparison to truncated cube-corner elements. Cube-corner sheeting having "preferred geometry" cube-corner elements may be manufactured by a laminae process (see, e.g., U.S. Pat. No. 7,156,527 (Smith)).

Cube-corner retroreflective sheeting is commonly produced by first manufacturing a molding tool that has a structured surface, wherein the structured surface corresponds either to the desired cube-corner element geometry in the finished sheeting or to a negative (inverted) copy thereof, depending upon whether the finished sheeting is to have cube-corner pyramids or cube-corner cavities (or both). The molding tool is then replicated using any suitable technique such as conventional nickel electroforming to produce tooling for forming cube-corner retroreflective sheeting by processes such as embossing, extruding, or cast-and-curing.

Alternative retroreflective articles and alternative methods for making retroreflective articles are desirable.

SUMMARY

In one aspect, the present disclosure describes a retroreflective article having a light transmissive support layer, the light transmissive support layer having generally opposed first and second major surfaces, and an array of composite cube-corner elements secured to the first major surface of the light transmissive support layer, wherein each composite cube-corner element has an apex and a base opposite the apex, and wherein each composite cube-corner element has a first light transmissive polymeric layer, a second light transmissive polymeric layer, and an interface therebetween. The first light transmissive polymeric layer includes the apex, and the second light transmissive polymeric layer includes at least a portion of the base, wherein the first light transmissive polymeric layer has a first index of refraction, wherein the second light transmissive polymeric layer has a second index of refraction, and wherein the first and second indices of refraction have an absolute difference of at least 0.0002.

In another aspect, the present disclosure describes a method of making a retroreflective article, the method including providing a molding tool having a microstructured surface including a plurality of cavities, partially filling the plurality of cavities with a first radiation curable resin, wherein the at least a portion of the plurality of cavities includes a cube-corner geometry, exposing the first radiation curable resin to a first irradiation to pre-cure the first radiation curable resin and provide pre-cured partial cube-corner structures, contacting a second radiation curable resin onto the pre-cured partial cube-corner structures, exposing the pre-cured partial cube-corner structures and the second radiation curable resin to a second irradiation to provide composite cube-corners on the surface of the molding tool, and separating the composite cube-corners from the surface of the molding tool.

In another aspect, the present disclosure describes retroreflective article having a body layer having generally opposed first and second major surfaces, and an array of composite cube-corner elements on the first major surface of the body layer, wherein each composite cube-corner element comprises an apex and a base opposite the apex, wherein each composite cube-corner element comprises a first light transmissive polymeric layer, a second light transmissive polymeric layer, and an interface therebetween, wherein the first light transmissive polymeric layer comprises the apex, wherein the second light transmissive polymeric layer is contiguous with the body layer, wherein the first light transmissive polymeric layer has a first index of refraction, wherein the second light transmissive polymeric layer has a second index of refraction, and wherein the first and second indices of refraction have an absolute difference of at least 0.0002.

In another aspect, the present disclosure describes a method of making a retroreflective article, the method including providing a molding tool having a microstructured surface including a plurality of cube-corner cavities, applying a first radiation curable resin to a portion of the cube-corner cavities in a desired pattern, partially filling a portion of the cube-corner cavities and forming partially filled cube corner cavities and unfilled cube-corner cavities, contacting the partially filled cube corner cavities and unfilled cube-corner cavities with a second radiation curable resin, wherein the second radiation curable resin is different from the first radiation curable resin, forming a composite, exposing the composite to an irradiation source to provide composite cube-corners and monolithic cube-corners on the surface of the molding tool, and separating the composite cube-corners and monolithic cube-corners from the surface of the molding tool.

In another aspect, the present disclosure describes a method of making a retroreflective article, the method including providing a molding tool having a microstructured surface including a plurality of cube-corner cavities, applying a first radiation curable resin to a portion of the cube-corner cavities in a desired pattern, partially filling a portion of the cavities and forming partially filled cube corner cavities and unfilled cube-corner cavities, exposing the composite to a first irradiation to provide pre-cured partial cube-corner structures, contacting the pre-cured partial cube-corner structures and unfilled cube-corner cavities with a second radiation curable resin, forming a composite, exposing the composite to a second irradiation to provide composite cube-corners and monolithic cube-corners on the surface of the molding tool, and separating the composite cube-corners and monolithic cube-corners from the surface of the molding tool.

In another aspect, the present disclosure describes a retroreflective article comprising a light transmissive support layer having generally opposed first and second major surfaces, an array of composite cube-corner elements and monolithic cube-corner elements secured to the first major surface of the light transmissive support layer, each cube-corner element comprising an apex and a base opposite the apex, wherein each composite cube-corner element comprises a first light transmissive polymeric layer comprising the apex, the first light transmissive polymeric layer having a first index of refraction, and a second light transmissive polymeric comprising at least a portion of the base, the second light transmissive polymeric layer having a second index of refraction, and wherein the first and second indices of refraction have an absolute difference of at least 0.0002.

"Cube-corner elements" refers to any arrangement, constituent of optical shape, or structure capable of retroreflecting incident light. The retroreflective structure includes cube-corner type trigonal pyramids, cube-corner type cavities, cube-corner type trigonal pyramids with reflective layers, cube-corner type cavities with reflective layers, and full cubes.

"Light transmissive" refers to a material that transmits at least 70% of the intensity of an incident light of a given wavelength (in some embodiments at least 80% or even at least 90% of the intensity of an incident light of a given wavelength).

"Microstructure", used herein in the context of an article having a surface bearing microstructure, refers to the configuration of a surface which depicts or characterizes the predetermined desired utilitarian purpose or function of the article. Discontinuities (e.g., projections and indentations in the surface) will deviate in profile from the average profile or center line drawn through the microstructure such that the sum of the areas embraced by the surface profile above the line is equal to the sum of those areas below the line, the line being essentially parallel to the nominal surface (bearing the microstructure) of the article. The heights of the deviations are ±0.005 micrometer to ±750 micrometers through a representative characteristic length of the surface (e.g., 1 centimeter to 30 centimeters). The average profile, or center line, can be plano, concave, convex, aspheric, or combinations thereof. Articles where the deviations are of low order (e.g., from ±0.005 micrometer to ±0.1 micrometer or, preferably, from ±0.005 micrometer to ±0.05 micrometers) and the deviations are of infrequent or minimal occurrence (i.e., the surface is free of any significant discontinuities), are those where the microstructure-bearing surface is an essentially "flat" or "perfectly smooth" surface, such articles being useful, for example, as precision optical elements or elements with a precision optical interface (e.g., ophthalmic lenses). Articles where the deviations are of the low order and of frequent occurrence are those bearing utilitarian discontinuities, as in the case of articles having anti-reflective microstructure. Articles where the deviations are of high order (e.g., from ±0.1 micrometer to ±750 micrometer) and attributable to microstructure comprising a plurality of utilitarian discontinuities which are the same or different and spaced apart or contiguous in a random or ordered manner, are articles (e.g., retroreflective cube-corner sheeting, linear Fresnel lenses, and video discs). The microstructure-bearing surface can contain utilitarian discontinuities of both the low and high orders. The microstructure-bearing surface may contain extraneous or non-utilitarian discontinuities so long as the amounts or types thereof do not significantly interfere with or adversely affect the predetermined desired utilities of the articles. In some embodiments, microstructural elements include at least one of cones, diffraction gratings, lenticulars, segments of a sphere, pyramids, cylinders, fresnels, or prisms. It may be necessary or desirable to select a particular oligomeric composition whose shrinkage upon curing does not result in the interfering extraneous discontinuities (e.g., a composition which shrinks only 2% to 6%). The profiles and the dimensions and spacing of the discontinuities are those discernible by an electron microscope at 1000× to 100,000×, or an optical microscope at 10× to 1000×.

"Optically variable mark" refers to a retroreflective mark exhibiting a varying appearance depending on, for example, the angle at which the mark is viewed, the type of light that is used to view the retroreflective mark (e.g., reflective light versus transmissive light, visible versus non-visible).

"Pre-cured" refers to a portion of the radiation curable, cross-linkable and/or reactable components in a radiation curable resin that have been exposed to an amount of radiation sufficient to partially cure, cross-link and/or react the radiation curable resin. In alternate embodiments of the present disclosure, the degree of reacted components can vary widely. A pre-cured radiation curable resin can be further cured to improve polymer properties (e.g., hardness and refractive index).

"Sheeting" refers to a thin piece of polymeric (e.g., synthetic) material. The sheeting may be of any width and length, such dimension only being limited by the equipment (e.g., width of the molding tool, or width of the slot die orifice) from which the sheeting was made.

"Visible" refers to being apparent and identifiable (i.e., to ascertain definitive characteristics of) to the unaided human eye of normal (i.e., 20/20) vision. By "unaided", it is meant without the use of a microscope or magnifying glass.

Exemplary uses of retroreflective articles described herein include traffic control signs, vehicle license plates, and conspicuity films.

Like reference numbers in the various figures indicate like elements. However, it will be understood that the use of a number to refer to a component in a given figure is not intended to limit the component in another figure labeled with the same number. Some elements may be present in identical or equivalent multiples; in such cases only one or more representative elements may be designated by a reference number but it will be understood that such reference numbers apply to all such identical elements. Unless otherwise indicated, all figures and drawings in this document are not to scale and are chosen for the purpose of illustrating different embodiments of the description. In particular the dimensions of the various components are depicted in illustrative terms only, and no relationship between the dimensions of the various components should be inferred from the drawings, unless so indicated. Although terms such as "top", bottom", "upper", lower", "under", "over", "front", "back", "outward", "inward", "up" and "down", and "first" and "second" may be used in this disclosure, it should be understood that those terms are used in their relative sense only unless otherwise noted. In particular, in some embodiments certain components may be present in interchangeable and/or identical multiples (e.g., pairs). For these components, the designation of "first" and "second" may apply to the order of use, as noted herein (with it being irrelevant as to which one of the components is selected to be used first).

DETAILED DESCRIPTION

Figure 1A:
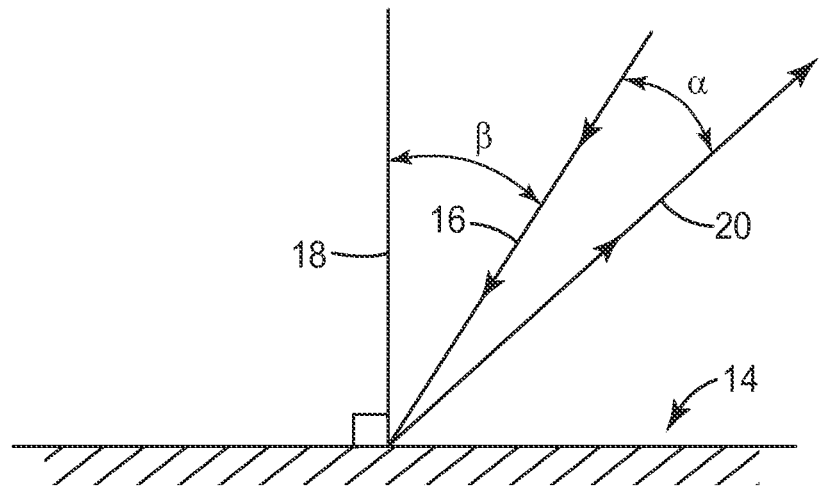
FIG. 1A is a diagram illustrating the nature and geometry of retroreflection.

In FIG. 1A, retroreflective surface 14 is shown with a ray or pencil of rays of light 16 coming from a distant source such as a vehicle headlight (not shown) and impinging on surface 14 at entrance angle, β, (the angle between incident ray 16 and normal 18 to surface 14). If surface 14 was an ordinary mirror that produced specular reflection, the emergent or reflected rays would leave surface 14 at the same angle but on the opposite side of the normal (not shown). If surface 14 was a diffuse reflector, emergent or reflected rays would go off indiscriminately in all directions (not shown) and only a small fraction would return to the source. However, with retroreflection there is a directional reflection by the surface such that a cone of brilliant light is returned toward the source, the axis of the cone being substantially the same as the axis of incident ray 16. By "cone of brilliant light" it is meant that the intensity of light within the cone is greater that would be the case where diffuse reflection occurs. This may hold true only where entrance angle, β, of the light does not exceed a certain value depending upon the characteristics of surface 14.

An observer's eye is seldom on the axis of incident light ray 16. Thus in the case of an automobile approaching a highway sign, there will be an angle between any given ray of incident light approaching the sign from each headlight and the reflective rays reaching the driver's eyes. Hence if the retroreflective surface is perfect in directional action, with incident light being returned only toward its source, it would have little or no utility as a sign. There should be an expansion or spreading out of retroreflected light rays in order that persons near, but off, the axis of the incident light may take advantage of the retroreflective characteristic of the reflector or sign, but this expansion should not be excessive or the retroreflective brightness of the sign will suffer through diffusion of reflected light outside the useful range. The deviation of particular ray 20 which is visible to an occupant of the car whose headlight emitted pencil of light rays 16 is illustrated in FIG. 1A. The acute angle between incident ray 16 and emergent ray 20 is designated as observation or divergence angle, α.

At great distances (e.g., several hundred meters or more), most vehicles present a similar observation angle geometry. However, at closer distances the configuration of a vehicle (i.e., the relative location of and distances between each headlight and the driver's eyes with regard to the sign) becomes more significant. For instance, at a distance of about 30 meters from a sign, for the driver of a typical automobile, the observation angle for light from a headlight to the driver's eyes is about 1° whereas for the driver of a large truck the observation angle may be substantially larger (e.g., about 3°). In order for the sign to be effective for the driver of the truck, the observation angle of retroreflected light from the truck's headlights must be reflected at a greater observation angle (i.e., the cone of brilliant light must be broader) than is necessary to benefit the driver of an automobile. It is therefore desirable to be able to obtain retroreflective sheeting having a broader cone of retroreflected light, as is provided by the retroreflective sheeting described herein, having composite cube-corners.

Figure 1B:
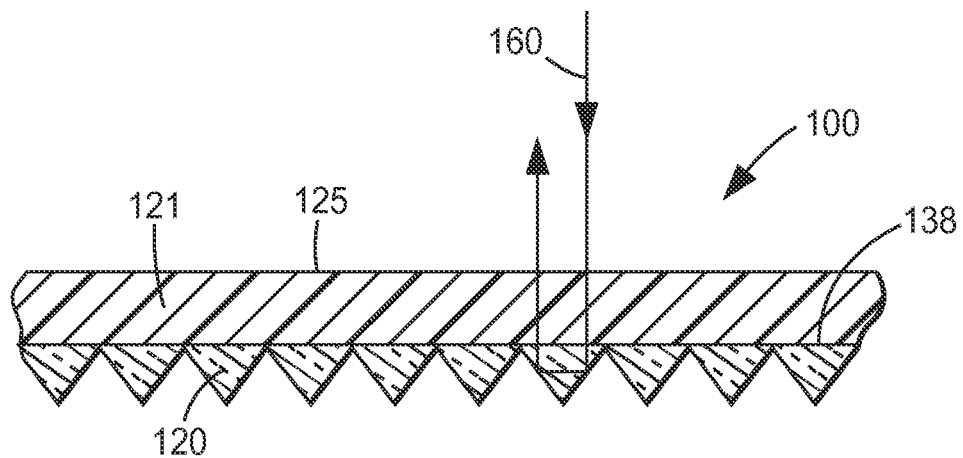
FIG. 1B is a cross-sectional view of Prior Art retroreflective sheeting.

FIG. 1B illustrate light ray 160 being retroreflected by prior art cube-corner retroreflective sheeting 100. Prior art cube-corner retroreflective sheeting 100 has multitude of cube-corner elements 120, shown as projecting from back side 138 of body layer 121, while body layer 121 is on front surface 125 of retroreflective sheeting 100. As shown in FIG. 1B, light ray 160 enters cube-corner sheeting 100 through front surface 125, then passes through body layer 121 and strikes the planar faces of cube-corner elements 120 and returns in the direction from which it came.

Figure 2:
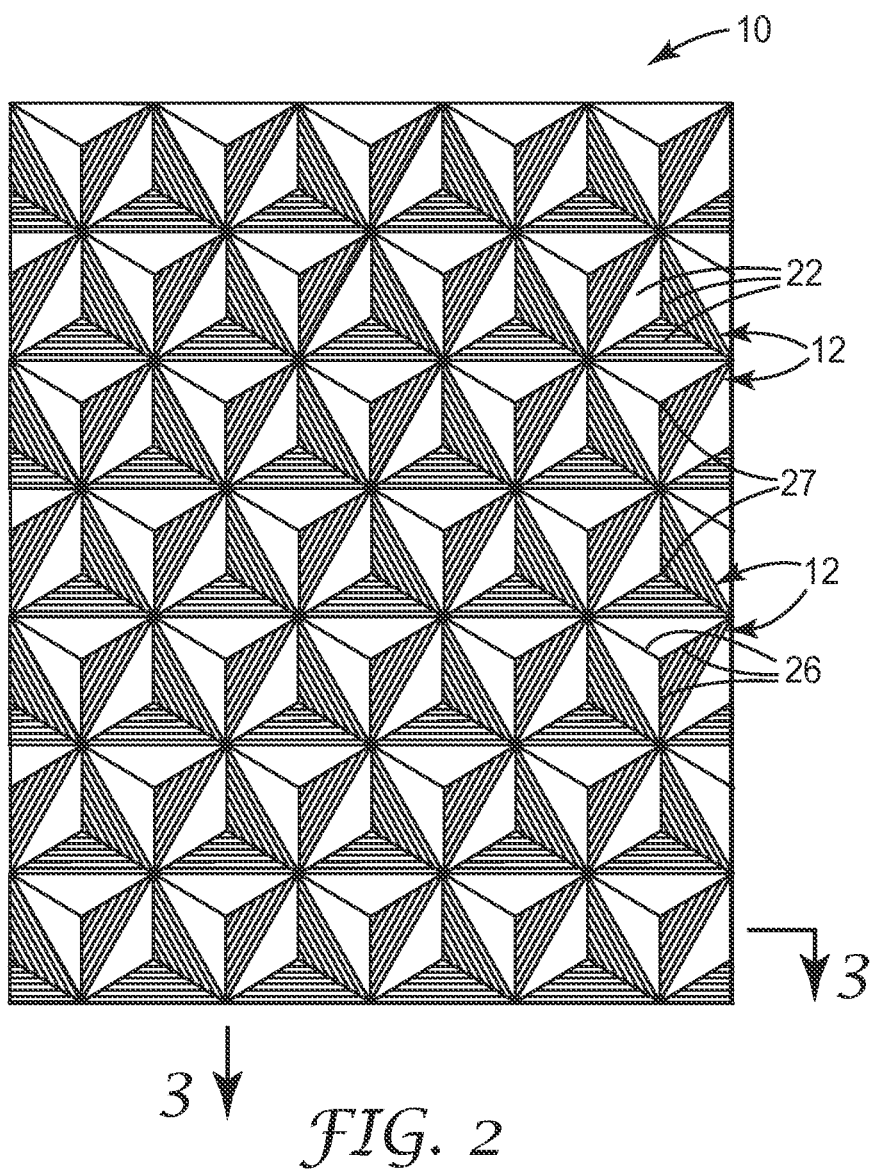
FIG. 2 is an exemplary embodiment of an article disclosed herein having an array of composite cube-corner elements.
Figure 3:
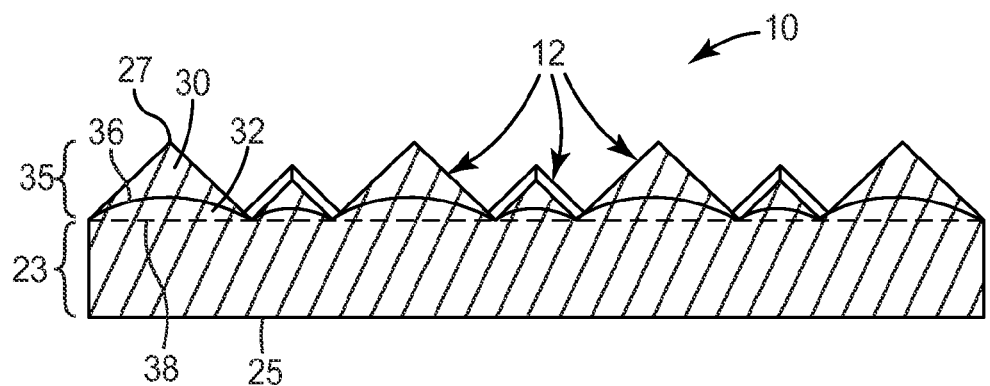
FIG. 3 is a cross-sectional view of the array of composite cube-corner elements in FIG. 2.

FIGS. 2 and 3 schematically illustrate exemplary embodiments of a portion of replicated composite cube-corner retroreflective sheeting 10. In the exemplary embodiment shown in FIG. 3, composite cube-corner elements 12 surmount body layer 23, the lower or front surface 25 of which is smooth or planar, and body layer 23 is contiguous with composite cube-corner elements 12, constituting what is referred to as a "land" portion. In some exemplary embodiments, lower or front surface 25 may be roughened, such as described in PCT Application Nos. WO2010048416, published Apr. 29, 2010 (Smith et al.) and WO9630786, published Oct. 3, 1996 (Nilsen). The dimensions of the land portion of the sheeting relative to the individual cube-corner optical elements will vary depending on the method chosen for manufacture and, ultimately, the end purpose of the sheeting. In some exemplary embodiments, it is desirable to keep the land portion to a minimal thickness, as, for example, when flexibility of the sheeting is desirable.

Figure 4:
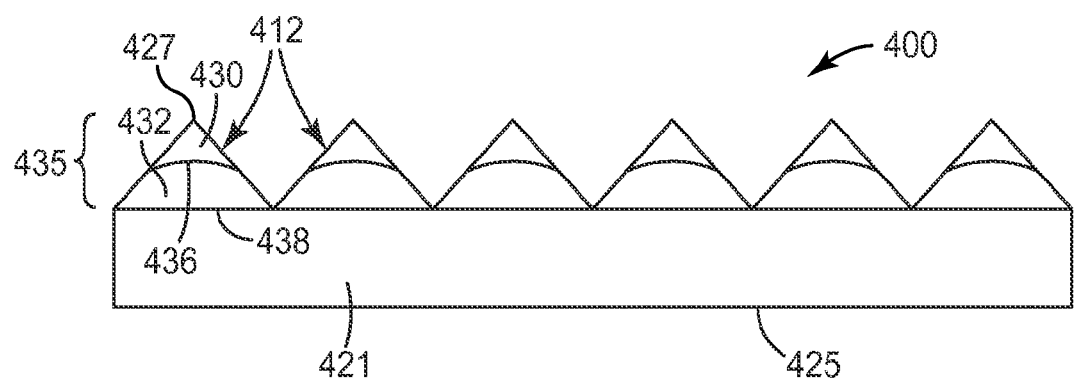
FIG. 4 is a schematic representation of a side view of a retroreflective article having composite cube-corner elements.

FIG. 4 depicts an alternative composition of a cube-corner retroreflective sheeting 400 comprising light transmissive support layer 421 and plurality of composite cube-corner elements 412. In contrast to the cube-corner retroreflective sheeting of FIG. 3, cube-corner retroreflective sheeting 400 has a minimal land portion (not shown). In one exemplary embodiment, light transmissive support layer 421 is the outermost layer on front side 425 of cube-corner retroreflective sheeting 400. Light impinges on and passes through light transmissive support layer 421, strikes the planar faces of plurality of composite cube-corner elements 412 and returns in the direction from which it came.

In the exemplary embodiment shown in FIG. 4, retroreflective sheeting 400 comprises light transmissive support layer 421 and plurality of composite cube-corner elements 412, each having apex 427 and base 438, and comprising first light transmissive polymeric layer 430 and second light transmissive polymeric layer 432. In the exemplary embodiment shown in FIG. 4, first light transmissive polymeric layer 430 comprises apex 427, and second light transmissive polymeric layer 432 comprises all of base 438. Typically, interface 436 is visually discernable between first light transmissive polymeric layer 430 and second light transmissive polymeric layer 432. Interface 436 is typically a curved surface, as shown.

Light transmissive support layer 421 may be secured directly to the base of composite cube-corner elements 412, or it may be secured to the composite cube-corner elements by a land layer. In some embodiments, the land layer is kept to a minimal thickness and is made from a high elastic modulus material.

Light transmissive support layer 421 can comprise an overlay film, a fabric, and/or a glass. In some exemplary embodiments, light transmissive support layer 421 is selected to be an overlay film having a low elastic modulus (e.g., less than about $13 \times 10^8$ pascals), and the cube-corner elements are selected to have a high elastic modulus (e.g., greater than $16 \times 10^8$ pascals), as described, for example, in U.S. Pat. No. 5,450,235 (Smith et al.). In some exemplary embodiments, the retroreflective sheeting 400 may have considerably greater flexibility than retroreflective sheeting 10 of FIG. 3.

In embodiments where the light transmissive support layer is selected to be a fabric, the index of refraction of the fibers in the fabric is selected to substantially match the index of refraction of the second light transmissive in the composite cube-corners. Regarding matching of the index of refraction of fibers with polymers in optical elements, see, for example, U.S. Pat. No. 7,406,239 (Ouderkirk et al.), the disclosure of which is incorporated herein by reference.

The light transmissive support layer typically comprises a low elastic modulus polymer to impart easy bending, curling, flexing, conforming, or stretching to the resultant retroreflective composite. Generally, the light transmissive support layer comprises a polymeric film having an elastic modulus of less than $13 \times 10^8$ pascals, and a glass transition temperature less than about 50° C. The polymer preferably is such that the light transmissive support layer retains its physical integrity under the conditions it is exposed to as the resultant composite retroreflective sheeting is formed. The polymer desirably has a Vicat softening temperature that is greater than 50° C. The linear mold shrinkage of the polymer desirably is less than 1 percent, although certain combinations of polymeric materials for the cube-corner elements and the overlay film will tolerate a greater extent of shrinking of the overlay film. Preferred polymeric materials are resistant to degradation by ultraviolet ("UV") light radiation so that the retroreflective sheeting can be used for long-term outdoor applications. The light transmissive support layer may be substantially transparent. For instance, films with a matte finish that become transparent when the resin composition is applied thereto, or that only become transparent during the fabrication process (e.g., in response to the curing conditions used to form the array of cube-corner elements) are useful herein.

The light transmissive support layer may be either a single layer or multi-layer component as desired. If multilayer, the layer to which the array of cube-corner elements is secured should have the properties described herein as useful in that regard with other layers not in contact with the array of cube-corner elements having selected characteristics as necessary to impart desired characteristics to the resultant composite retroreflective sheeting. Either surface of the light transmissive support layer may contain printed or formed (e.g., stamped or embossed) symbols and/or indicia, such as generally described in U.S. Pat. No. 5,763,049 (Frey et al).

Exemplary polymers that may be employed in the light transmissive support layer used herein include fluorinated polymers, ionomeric ethylene copolymers, low density polyethylenes, plasticized vinyl halide polymers, and polyethylene copolymers.

Exemplary fluorinated polymers include poly(chlorotrifluoroethylene) (e.g., such as that available from 3M Company, St. Paul, Minn., under the trade designation "KEL-F800"), poly(tetrafluoroethylene-co-hexafluoropropylene) (e.g., such as that available from Norton Performance, Brampton, Mass., under the trade designation "EXAC FEP"), poly(tetrafluoroethylene-co-perfluoro(alkyl)vinylether) (e.g., such as that available from Norton Performance under the trade designation "EXAC PEA"), and poly(vinylidene fluoride-co-hexafluoropropylene) (e.g., such as that available from Pennwalt Corporation, Philadelphia, Pa., under the trade designation "KYNAR FLEX-2800").

Exemplary ionomeric ethylene copolymers include poly (ethylene-co-methacrylic acid) with sodium or zinc ions (e.g., such as those available from E.I. duPont Nemours, Wilmington, Del., under the trade designations "SURLYN-8920" and "SURLYN-9910").

Exemplary low density polyethylenes include low density polyethylene, linear low density polyethylene, and very low density polyethylene.

Exemplary plasticized vinyl halide polymers include plasticized poly(vinylchloride).

Exemplary polyethylene copolymers that include acid functional polymers include (e.g., poly(ethylene-co-acrylic acid) (EAA), poly(ethylene-co-methacrylic acid) (EMA), poly(ethylene-co-maleic acid), and poly(ethylene-co-fumaric acid)), acrylic functional polymers (e.g., poly(ethylene-co-alkylacrylates) where the alkyl group is methyl, ethyl, propyl, butyl, et cetera, or $CH_3(CH_2)_n$ where n is 0 to 12), and poly(ethylene-co-vinylacetate).

In some embodiments, the light transmissive support layer can include aliphatic and aromatic polyurethanes derived from the following monomers (i)-(iii):

(i) diisocyanates such as dicyclohexylmethane-4,4'-diisocyanate, isophorone diisocyanate, 1,6-hexamethylene diisocyanate, cyclohexyl diisocyanate, diphenylmethane diisocyanate, and combinations of these diisocyanates;

(ii) polydiols such as polypentyleneadipate glycol, polytetramethylene ether gylcol, polycaprolactonediol, poly-1,2-butylene oxide glycol, and combinations of these polydiols; and (iii) chain extenders such as butanediol and hexanediol. Exemplary urethane polymers include those available from Morton International Inc., Seabrook, N.H., under the trade designations "PN-04" and "3429", and the urethane polymer available from B. F. Goodrich Company, Cleveland, Ohio, under the trade designation "X-4107".

The exemplary polymers that may be employed in the light transmissive support layer used herein may also be used in combination with each other. Preferred polymers for the light transmissive support layer include: the ethylene copolymers that contain units that contain carboxyl groups or esters of carboxylic acids (e.g., poly(ethylene-co-acrylic acid) (EAA), poly(ethylene-co-methacrylic acid) (EMA), poly(ethylene-co-vinylacetate)), ionomeric ethylene copolymers, plasticized poly(vinylchloride), and the aliphatic urethanes. These polymers may be preferred, for example, for at least one of the following reasons: suitable mechanical properties, good adhesions to the composite cube-corner layer, clarity, and environmental stability.

Referring again to the exemplary embodiment shown in both FIGS. 2 and 3, reference 12 generally designates one of the minute composite cube-corner elements of formations disposed in an array on one side of sheeting 10. Each composite cube-corner element 12 has the shape of a trihedral prism with three exposed planar faces 22, substantially perpendicular to one another, with apex 27 of the prism typically vertically aligned with the center of the base. In some exemplary embodiments, the apex 27 may be canted with respect to the center of the base (see, e.g., U.S. Pat. No. 4,588,258 (Hoopman)) The angle between the faces 22 is the same for each cube-corner element in the array, and will be about 90°. Such angle can slightly deviate from 90° by design (i.e., the angle will be dependent upon the particular application of the sheeting), as described in U.S. Pat. No. 4,775,219 (Appeldorn). Cube-corner elements 12 typically have a height in the range of about 20 to 500 micrometers, and more typically in the range of about 35 to 100 micrometers.

A specular reflective coating (not shown) can be placed on the back side (opposite side from front side 425) of the cube-corner elements to enhance retroreflectivity. In some embodiments, a metallic coating can be applied by known techniques such as vapor depositing or chemically depositing a metal such as aluminum, silver, or nickel. A primer layer may be applied to the back side of the cube-corner elements to promote the adherence of the metallic coating. In addition to or in lieu of a metallic coating, a seal film can be applied to the back side of the cube-corner elements (see, e.g., U.S. Pat. No. 5,691,846 (Benson et al.), U.S. Pat. No. 5,784,197 (Frey et al.), U.S. Pat. No. 6,318,867 (Bacon et al.), and U.S. Pat. No. 7,611,251 (Thakkar et al.)). The seal film maintains an air interface at the back side of the cubes to enhance retroreflectivity. A backing or an adhesive layer can also be disposed behind the cube-corner elements and/or seal film to secure cube-corner retroreflective sheeting 400 to a substrate.

As is illustrated in FIG. 3, composite cube-corner elements 12 in sheet 10 can be all of the same dimensions and aligned in a two-dimensional array or pattern of rows and columns, the bases being in the same plane, and adjacent elements being contiguous at the edges of their bases such that there are no margins or flat areas between adjacent elements, or spaced apart (not shown) as desired. If desired, different elements in the array may have varying dimensions and orientations (e.g., the bases may be tilted or otherwise in different planes with respect to each other). In some embodiments (not shown) the protruding elements each possess more than one cube-corner apex. Various types of cube-corner elements have been shown to be useful in providing retroreflective articles, including: truncated cubes (see, e.g., U.S. Pat. No. 4,588,258 (Hoopman) and U.S. Pat. No. 5,138,488 (Szczech)), directly machined cubes (see, e.g., U.S. Pat. No. 5,600,484 (Benson)), and full cube-corners (see, e.g., U.S. Pat. No. 6,257,860 (Luttrell), and U.S. Pat. No. 7,556,386 (Smith)).

In the exemplary embodiment shown in FIG. 3, cube-corner elements 12 are composite cube-corners 35, each having apex 27 and base 38, and comprising first light transmissive polymeric layer 30 and second light transmissive polymeric layer 32. In the exemplary embodiment shown in FIG. 3, first light transmissive polymeric layer 30 comprises apex 27, and second light transmissive polymeric layer 32 comprises all of base 38. In some other exemplary embodiments (not shown), first light transmissive polymeric layer 30 may be a contiguous layer (within each cube-corner element 12) that includes apex 27 and a first portion of base 38, and second light transmissive polymeric layer 32 includes a second portion of base 38.

First light transmissive layer 30 and second light transmissive layer 32 are selected to have a difference in refractive index. First light transmissive layer 30 has a first index of refraction, $n_1$, and second light transmissive layer 32 has a second index of refraction, $n_2$, and first index of refraction, $n_1$, and second index of refraction, $n_2$, have an absolute difference in refractive index of at least 0.0002 (i.e., $|n_1-n_2|{\geq}0.0002$). In some embodiments, the absolute difference in refractive index is at least 0.001, at least 0.01, or even at least 0.1. In some embodiments, first index of refraction, $n_1$, is greater than second index of refraction, $n_2$, whereas in some other embodiments, second index of refraction, $n_2$, is greater than first index of refraction, $n_1$.

Typically, interface 36 is visually discernable between first light transmissive polymeric layer 30 and second light transmissive polymeric layer 32. Interface 36 is typically a curved surface, as shown.

Without being bound by theory, it is thought that retroreflective articles having composite cube-corner elements each having first and second light transmissive layers selected to have an absolute difference of refractive index are useful for diverting retroreflected light to higher observation angles than in monolithic cube-corner elements of comparable geometry and materials.

In composite cube-corner elements described herein, the percent by volume (% by volume) of the first and second light transmissive polymeric layers may be selected to obtain a variety of observation angle characteristics. In some embodiments, each of the comprise cube-corner elements may comprise up to 95% by volume of the second light transmissive polymeric layer, or up to 90% by volume, up to 75% by volume, up to 60% by volume, up to 50% by volume, up to 25% by volume, or even up to 10% by volume, of the second light transmissive polymeric layer, the remainder of the volume of each of the comprise cube-corner elements comprising the first light transmissive polymeric layer.

In the discussion of FIGS. 3 and 4, mention was made of interfaces 36 and 436, respectively, as typically being visually discernable and also typically being curved. Without being bound by theory, it is thought that during irradiation of a first radiation curable resin disposed in cavities on a molding tool to form first light transmissive polymeric layer 31 (or 431), the radiation curable resin may undergoes some degree of shrinkage due to bonds being formed in the first radiation curable resin, without pulling away from the walls of the cavity, and with the resulting formation of a curved surface in first light transmissive polymeric layer 31 (or 431). Again, without being bound by theory, it is thought that the level of a first irradiation may be varied to induce varying levels of bond forming reactions in the first radiation curable resin, which in turn results in varying degrees of curvature being introduced in the surface of first light transmissive polymeric layer 31 (or 431).

The first light transmissive polymeric layer and the second light transmissive polymeric layer in the composite cube-corner elements are typically formed from radiation curable resins capable of being crosslinked by a free radical polymerization mechanism by exposure to actinic radiation, (e.g., electron beam, ultraviolet light, or visible light).

Radiation-initiated cationically polymerizable resins also may be used.

In some embodiments, the first light transmissive polymeric layer and the second light transmissive polymeric layer each include a light transmissive polymeric material, wherein the light transmissive polymeric material in the first light transmissive polymeric layer is a more highly radiated form of the light transmissive material in the second light transmissive polymeric layer.

The radiation curable resin composition comprises one or more polymerizable ethylenically unsaturated monomers, oligomers, prepolymers, or combination thereof. After curing, the ethylenically unsaturated components are reacted into a polymer. Preferred polymerizable compositions are 100% solids and substantially free of solvent. Radiation curable resins suitable for forming the array of cube-corner elements may be blends of photoinitiator and at least one compound bearing an acrylate group. Preferably the resin blend contains a monofunctional, a difunctional, or a polyfunctional compound to ensure formation of a cross-linked polymeric network upon irradiation. In some embodiments of the method, the first radiation curable resin and the second radiation curable resin are each independently selected from the group consisting of monofunctional, difunctional, and polyfunctional acrylates, and combinations thereof.

Exemplary radiation curable resins that are capable of being polymerized by a free radical mechanism that can be used herein include acrylic-based resins derived from epoxies, polyesters, polyethers, and urethanes, ethylenically unsaturated compounds, isocyanate derivatives having at least one pendant acrylate group, epoxy resins other than acrylated epoxies, nitrogen-containing polymerizable resin composition (see, e.g., U.S. Pat. No. 7,862,187 (Thakkar et al.), the disclosure of which is incorporated herein by reference), and mixtures and combinations thereof. The term "acrylate" is used here to encompass both acrylates and methacrylates. U.S. Pat. No. 4,576,850 (Martens) reports examples of crosslinked resins that may be used in cube-corner element arrays of the present disclosure.

Ethylenically unsaturated resins include both monomeric and polymeric compounds that contain atoms of carbon, hydrogen and oxygen, and optionally nitrogen, sulfur, and the halogens may be used herein. Oxygen or nitrogen atoms, or both, are generally present in ether, ester, urethane, amide, and urea groups. Ethylenically unsaturated compounds preferably have a number average molecular weight of less than about 4,000 and preferably are esters made from the reaction of compounds containing aliphatic monohydroxy groups, aliphatic polyhydroxy groups, and unsaturated carboxylic acids (e.g., acrylic acid, methacrylic acid, itaconic acid, crotonic acid, iso-crotonic acid, and maleic acid). Such materials are typically readily available commercially and can be readily cross linked.

Some exemplary compounds having an acrylic or methacrylic group that are suitable for use in the radiation curable resins of the present disclosure include monofunctional compounds (e.g., ethylacrylate, n-butylacrylate, isobutylacrylate, 2-ethylhexylacrylate, n-hexylacrylate, n-octylacrylate, isooctyl acrylate, isobornyl acrylate, tetrahydrofurfuryl acrylate, 2-phenoxyethyl acrylate, and N,N-dimethylacrylamide), difunctional compounds (e.g., 1,4-butanediol diacrylate, 1,6-hexanediol diacrylate, neopentylglycol diacrylate, ethylene glycol diacrylate, triethyleneglycol diacrylate, tetraethylene glycol diacrylate, and diethylene glycol diacrylate), and polyfunctional compounds (e.g., trimethylolpropane triacrylate, glyceroltriacrylate, pentaerythritol triacrylate, pentaerythritol tetraacrylate, and tris(2-acryloyloxyethyl)isocyanurate).

Monofunctional compounds typically tend to provide faster penetration of the material of the overlay film, and difunctional and polyfunctional compounds typically tend to provide more crosslinked, stronger bonds at the interface between the cube-corner elements and overlay film.

Some other exemplary ethylenically unsaturated compounds and resins include styrene, divinylbenzene, vinyl toluene, N-vinyl formamide, N-vinyl pyrrolidone, N-vinyl caprolactam, monoallyl, polyallyl, and polymethallyl esters (e.g., diallyl phthalate and diallyl adipate), and amides of carboxylic acids (e.g., N,N-diallyladipamide).

Cationically polymerizable materials including materials containing epoxy and vinyl ether functional groups may be used herein. These systems are photoinitiated by onium salt initiators, such as triarylsulfonium, and diaryliodonium salts.

In one embodiment, the polymerizable resin comprises a combination of at least one difunctional epoxy (meth)acrylate, at least one difunctional (meth)acrylate monomer, and at least one polyfunctional compound having at least three (meth)acrylate groups.

The difunctional epoxy (meth)acrylate, as well as the difunctional (meth)acrylate monomer may be present in the polymerizable composition in an amount of at least 5 wt. %, or at least 10 wt. %. Typically, the amount of such difunctional (meth)acrylate monomer does not exceed about 40 wt. %. One exemplary epoxy diacrylate is available from Cytec Industries Inc., Smyrna, Ga., under the trade designation "EBECRYL 3720".

The polyfunctional compound is typically present in the polymerizable composition in an amount of at least 10 wt. %, at least 15 wt. %, at least 20 wt. %, at least 25 wt. %, at least 30 wt. %, at least 35 wt. %, or even at least 40 wt. %. Typically, the amount of polyfunctional compound is not greater than about 70 wt. %.

Since methacrylate groups tend to be less reactive than acrylate groups, acrylate functionality is sometimes preferred.

Compositions curable by UV irradiation generally include at least one photoinitiator. The photoinitiator can be used at a concentration in a range from 0.1 wt. % to 10 wt. %. More typically, the photoinitiator is used at a concentration in a range from 0.2 wt. % to 3 wt. %.

In general the photoinitiator is at least partially soluble (e.g., at the processing temperature of the resin) and substantially colorless after being polymerized. The photoinitiator may be colored (e.g., yellow), provided that the photoinitiator is rendered substantially colorless after exposure to the UV light source.

Suitable photoinitiators include monoacylphosphine oxide and bisacylphosphine oxide. Available mono or bisacylphosphine oxide photoinitiators include 2,4,6-trimethylbenzoyldiphenylphosphine oxide, available from BASF Corporation, Clifton, N.J., under the trade designation "LUCIRIN TPO", ethyl-2,4,6-trimethylbenzoylphenyl phosphinate, also available from BASF Corporation, under the trade designation "LUCIRIN TPO-L", and bis(2,4,6-trimethylbenzoyl)-phenylphosphine oxide available from Ciba Specialty Chemicals, Tarrytown, N.Y., under the trade designation "IRGACURE 819". Other suitable photoinitiators include 2-hydroxy-2-methyl-1-phenyl-propan-1-one, available from Ciba Specialty Chemicals, under the trade designation "DAROCUR 1173", as well as other photoinitiators available from Ciba Specialty Chemicals, under the trade designations "DAROCUR 4265", "IRGACURE 651", "IRGACURE 1800", "IRGACURE 369", "IRGACURE 1700", and "IRGACURE 907".

Free radical scavengers or antioxidants may be used, typically, in a range from about 0.01 wt. % to 0.5 wt. %. Suitable antioxidants include hindered phenolic resins such as those available from Ciba Specialty Chemicals, under the trade designations "IRGANOX 1010", "IRGANOX 1076", "IRGANOX 1035", and "IRGAFOS 168".

The cube-corner or body layer composition may optionally comprise one or more reactive (e.g., ethylenically unsaturated) ingredients and/or one or more non-reactive ingredients. Various additives such as solvent, chain transfer agents, colorants (e.g., dyes), antioxidants, light stabilizers, UV absorbers, processing aids such as antiblocking agents, releasing agents, lubricants, and other additives may be added to the body layer or cube-corner elements as described in U.S. Pat. No. 5,450,235 (Smith et al.).

Colorants, UV absorbers, light stabilizers, free radical scavengers or antioxidants, processing aids such as antiblocking agents, releasing agents, lubricants, and other additives may be added to one or both of the composite cube-corner elements and light transmissive support layer if desired. The particular colorant selected depends on the desired color; colorants typically are added in a range from 0.01 wt. % to 0.5 wt. %. UV absorbers typically are added in a range from 0.5 wt. % to 2 wt. %. Suitable UV absorbers include derivatives of benzotriazole (e.g., those available under the trade designations "TINUVIN 327", "TINUVIN 328", "TINUVIN 900", "TINUVIN 1130", and "TINUVIN-P" from Ciba Specialty Chemicals), chemical derivatives of benzophenone (e.g., those available under the trade designations "UVINUL M40", "UVINUL 408", and "UVINUL D-50" from BASF Corporation, and "SYNTASE 230", "SYNTASE 800", and "SYNTASE 1200" from Neville-Synthese Organics, Inc., Pittsburgh, Pa.), or chemical derivatives of diphenylacrylate (e.g., available under the trade designation "UVINUL N35" and "UVINUL 539" from BASF Corporation). Light stabilizers that may be used include hindered amines, which are typically used in a range from 0.5 wt. % to 2 wt. %. Examples of hindered amine light stabilizers include those available under the trade designations "TINUVIN 144", "TINUVIN 292", "TINUVIN 622", "TINUVIN 770", and "CHIMASSORB 944" from the Ciba Specialty Chemicals. Free radical scavengers or antioxidants may be used, typically, in a range from 0.01 wt. % to 0.5 wt. %. Suitable antioxidants include hindered phenolic resins such as those available under the trade designations "IRGANOX 1010", "IRGANOX 1076", "IRGANOX 1035", "MD-1024", and "IRGAFOS 168", available from the Ciba Specialty Chemicals. Small amounts of other processing aids, typically no more than 1 wt. % of the polymer resins, may be added, for example, to improve the resin's processibility. Useful processing aids include fatty acid esters, fatty acid amides available, for example, from Glyco Inc., Norwalk, Conn., or metallic stearates available, for example, from Henkel Corp., Hoboken, N.J., as well as from Hoechst Celanese Corporation, Somerville, N.J., under the trade designation "WAX E".

If desired, the polymeric materials of the retroreflective sheeting may also contain substances such as flame retardants that may enhance desirable properties of the resultant sheeting as well as articles to which it is attached.

Cube-corner retroreflective sheeting can be produced as is known in the art, including first manufacturing a master molding tool that has a structured surface, such structured surface corresponding either to the desired cube-corner element geometry in the finished sheeting or to a negative (inverted) copy thereof, depending upon whether the finished sheeting is to have cube-corner pyramids or cube-corner cavities (or both). The molding tool is then replicated using any suitable technique such as conventional nickel electroforming to produce tooling for forming cube-corner retroreflective sheeting by processes such as embossing, extruding, or cast-and-curing. Known methods for manufacturing the master molding tool include pin-bundling techniques, direct machining techniques, and techniques that employ laminae such as those described in U.S. Pat. No. 7,188,960 (Smith). Various microreplication methods for making cube-corner sheeting are described, for example, in U.S. Pat. No. 3,689,346 (Rowland), U.S. Pat. No. 3,811,983 (Rowland), U.S. Pat. No. 4,332,847 (Rowland), U.S. Pat. No. 4,601,861 (Pricone et al.), U.S. Pat. No. 5,491,586 (Phillips), U.S. Pat. No. 5,642,222 (Phillips), U.S. Pat. No. 5,691,846 (Benson et al.), U.S. Pat. No. 6,200,399 (Thielman), U.S. Pat. No. 7,410,604 (Erickson), and U.S. Pat. No. 7,611,251 (Thakkar et al.). These microreplication processes produce a retroreflective sheeting with prismatic structures that have been precisely and faithfully replicated from a microstructured molding tool having a negative image of the desired prismatic structure. In some embodiments, the elements have a shape in plan view selected from trapezoids, rectangles, parallelograms, pentagons, and hexagons.

If the angles between faces of a replicated cube-corner element cannot be controlled and maintained (e.g., because of shrinkage effects, distortion upon removal from the molding tool, or distortion due to thermal or mechanical stresses), the efficiency of retroreflection will be materially affected. Even a slight lack of control and maintenance of the cube-corner geometry can significantly affect the resultant retroreflective efficiency.

The radiation curable resin may be poured or pumped, for example, directly into a dispenser that feeds a slot die apparatus.

The method of manufacturing the retroreflective sheeting of the current description includes at least two irradiations of radiation curable resin. For example, the first radiation curable resin is pre-cured upon exposure to a suitable radiant energy source (i.e., actinic radiation), forming pre-cured partial cube-corner structures. Typically, the pre-cured material will have a degree of shrinkage so that a change in the refractive index with respect to uncured radiation curable resin can be detected, or it may become gelled, partially solidified, or non-flowable. The second radiation curable resin is contacted onto the pre-cured first radiation curable resin, and both resins are then subjected to a second irradiation (i.e., actinic radiation) to sufficiently harden all of the irradiated radiation curable resin prior to its removal from the tool.

In some embodiments, actinic irradiation sources typically include ultraviolet ("UV") and electron beam irradiation. Suitable sources of UV irradiation include UV light emitting diodes (UV LEDs). Combinations of cooling and curing may also be employed.

Figure 5A:
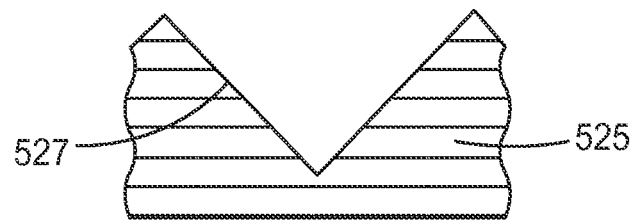
FIGS. 5A-5F are schematic representations of a cube-corner recess in a molding tool in the progressive deposition and subsequent partial curing from irradiation which occur during the production of a composite cube-corner.
Figure 5B:
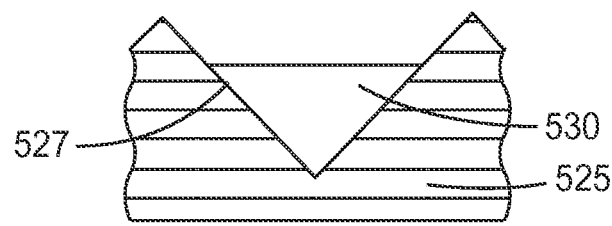
Figure 5C:
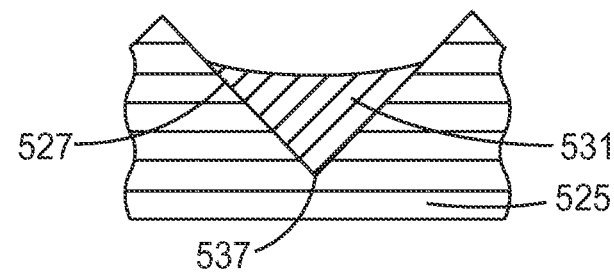
Figure 5D:
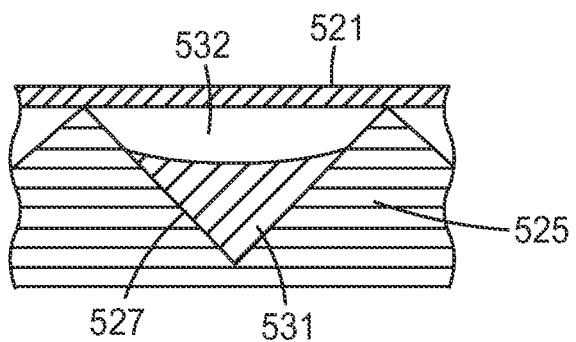

FIGS. 5A-5F are diagrammatical representations of a cube-corner recess in a molding tool in the progressive deposition and subsequent partial curing from irradiation which occur during the production of a composite cube-corner in a retroreflective article of the present disclosure. FIG. 5A represents cavity 527 in a surface of microreplicated tool 525. In FIG. 5B, first radiation curable resin 530 partially fills cavity 527. Upon a first radiation, first radiation curable resin 530 is pre-cured, forming a partially cured partial cube-corner structure 531, which includes cube-corner apex 537, as shown in FIG. 5C. In FIG. 5D, second radiation curable resin 532 (which may be the same as or different from first radiation curable resin 530) is brought into contact with partially cured partial cube-corner structure 531, filling cavity 527 and in the exemplary embodiment shown in FIG. 5D, light transmissive support layer 521 is in contact with second radiation curable resin 532. In some embodiments of the method, the second radiation curable resin is brought into contact with a light transmissive support layer prior to the second irradiation, wherein the second irradiation passes through the light transmissive support layer.

In some embodiments of the method, the first radiation curable resin shrinks by at least 5 percent by volume when cured. In some embodiments of the method, the first radiation curable resin shrinks in a range from 5 percent by volume to 20 percent by volume when cured.

In some embodiments of the method, the first radiation curable resin and second radiation curable resin are the same as each other.

Figure 5E:
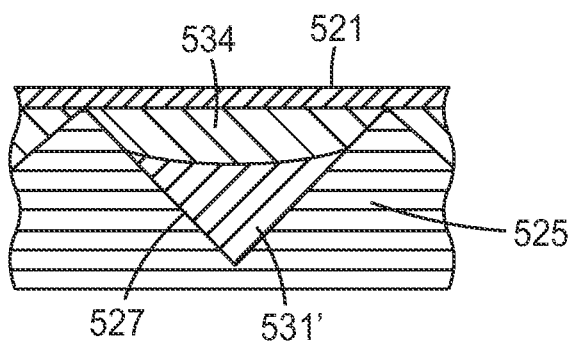
Figure 5F:
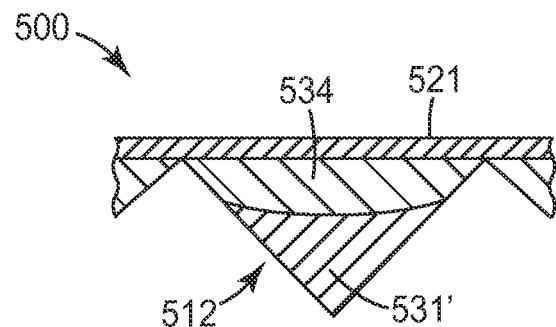

In an alternate embodiment (not shown), the cavity may be over-filled with a second radiation curable resin to form a land layer, which may be cured to form a body layer, as was presented in FIG. 3 (see body layer 323). In yet another alternate embodiment (not shown), the cavity may be over-filled with a second radiation curable resin to form a land layer and also have a light transmissive support layer overlaying the land layer. FIG. 5E shows composite cube-corner 535 after a second irradiation, having cured cube-corner structures 531 and 534 and interface 536. FIG. 5F shows retroreflective article 500 removed from the molding tool.

In an alternate embodiment (not show) the first radiation curable resin is selectively applied (e.g., coated in a desired pattern) to a portion of the cube-corner cavities. Exemplary ways for applying the first radiation curable resin to a portion of the cube-corner cavities in the molding tool in a desired pattern include contact printing, non-contact printing, pattern coating, and combinations thereof. Examples of contact printing include printing surface makes direct contact with a tool: direct and offset flexographic, direct and offset gravure, direct and offset lithographic, direct and offset screen printing. Examples of non-contact printing include ink-jet, spray, acoustic, electrostatic, and digital deposition. Examples of pattern coating include patterned die (for large rectangles) and needle (for downstream lines). An example of a combination of printing techniques is ink-jetting on a transfer roll instead of on a tool.

In some embodiments, the light transmissive support layer may include an adhesion promoting surface treatment in order to enhance bonding to the composite cube-corner elements. Various adhesion promoting surface treatments are known and include mechanical roughening, chemical treatment, (e.g., air or inert gas (e.g., nitrogen)) corona treatment (e.g., such as described in U.S. Pat. No. 7,442,442 (Strobel et al.)), plasma treatment, flame treatment, and actinic radiation.

The process of forming retroreflective article 500 as show in FIGS. 5A-5F may be carried out in either a batch mode or a continuous mode. In a batch mode process, the molding tool may be a micro-structured tool, (e.g., a micro-structured film or a metal plate having a microstructure in a surface thereof). In a continuous mode process, the molding tool may be, for example, a roll or a continuous belt having a microstructure in a surface thereof.

The molding tool of the present disclosure has a molding surface having a plurality of cavities opening thereon which have the shape and size suitable for forming desired cube-corner elements. The opening at the top surface of a cavity corresponds to the base of a resultant cube-corner element. The cavities, and thus resultant cube-corner elements, may be three sided pyramids having one cube-corner each (see, e.g., U.S. Pat. No. 4,588,258 (Hoopman)), may have a rectangular base with two rectangular sides and two triangular sides such that each element has two cube-corners each (see, e.g., U.S. Pat. No. 4,938,563 (Nelson et al.)), or may be of other desired shape, having at least one cube-corner each (see, e.g., U.S. Pat. No. 4,895,428 (Nelson et al.)). It will be understood by those skilled in the art that any cube-corner element may be used in accordance with the present disclosure. Although the present disclosure is described with particular reference to composite cube-corner elements, it will be understood that the articles described herein may include additional composite microstructured replicated elements that are secured to an overlay film in the manner of the composite cube-corner element discussed herein.

The molding tool should be such that the cavities will not deform undesirably during fabrication of the composite article, and such that the array of cube-corner elements can be separated therefrom after curing. Exemplary substrates known to be useful for forming molds for replication of cube-corner elements include materials that can be directly machined. Such materials preferably machine cleanly without burr formation, exhibit low ductility and low graininess, and maintain dimensional accuracy after groove formation. A variety of machinable plastics, including both thermoset and thermoplastic materials (e.g., acrylics), and machinable metals, including nonferrous metals (e.g., aluminum, brass, copper, and nickel) are known. In many instances, it may be desired to use a first or later generation replicate of a machined or shaped surface as the molding tool (i.e., the member on which the cube-corner sheeting of the invention is formed). Depending upon the molding tool used and the nature of the resin composition, the cured array may separate from the molding tool readily or a parting layer may be necessary to achieve desired separation characteristics. Exemplary parting layer materials include an induced surface oxidation layer, an intermediate thin metallic coating, chemical silvering, and combinations of different materials or coatings. If desired, suitable agents may be incorporated into the resin composition to achieve desired separation characteristics.

The molding tool can be made, for example, from polymeric, metallic, composite, or ceramic materials. In some embodiments, curing of the resin will be performed by applying radiation through the molding tool. In such instances, the molding tool should be sufficiently transparent to permit irradiation of the resin therethrough. Exemplary materials from which molding tools for such embodiments can be made to include polyolefins and polycarbonates. Metal molding tools are typically preferred, however, as they can be formed in desired shapes and provide excellent optical surfaces to maximize retroreflective performance of a given cube-corner element configuration.

Figure 6:
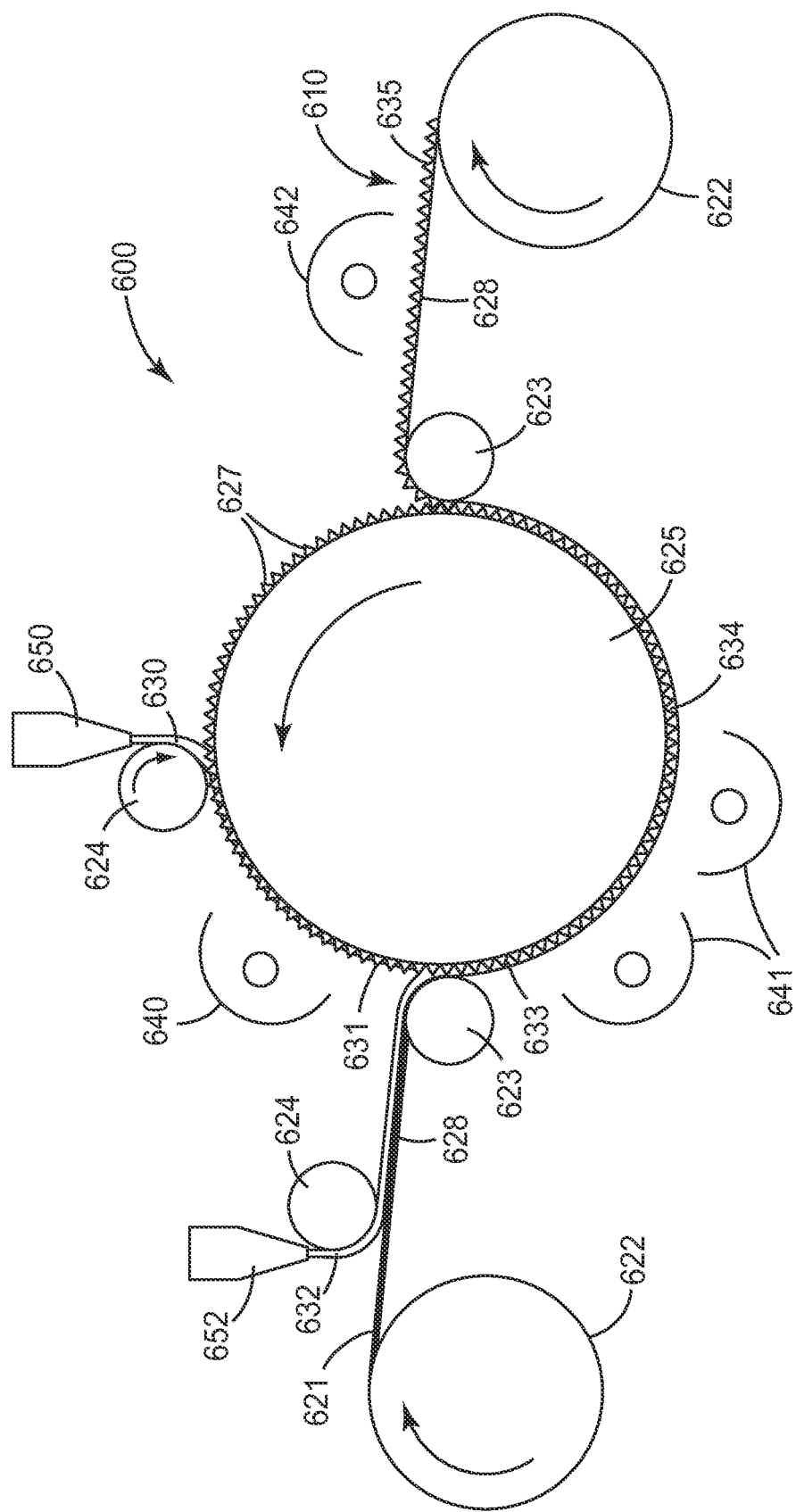
FIG. 6 is a schematic representation of an exemplary process configuration for practice of a method of making a retroreflective article having a two-dimensional array of composite cured cube-corner elements.

FIG. 6 shows an exemplary embodiment of apparatus 600 having roll 625 onto which is coated first radiation curable resin 630 from die 650, optionally using first roll 624 to aid in delivery of first radiation curable resin 630, partially filling cavities 627 in the surface of roll 625. As roll 625 rotates, first radiation curable resin 630 passes first irradiation source 640, forming partially cured partial cube-corner structures 631, each of which is a first light transmissive polymeric layer of a composite cube-corner that is being formed. Second radiation curable resin 632 (which may be the same as or different from first radiation curable resin 630) is coated from die 652 onto light transmissive support layer 621 coming from supply roll 622, along with optional light transmissive carrier film 628. Second radiation curable resin 632 is pressed into contact with partially cured partial cube-corner structures 631 with roll 623, and composite 633 (that includes light transmissive support layer 621, second radiation curable resin 632, and partially cured partial cube-corner structures 631) passes second irradiation source 641, forming composite cube-corners 635 having first light transmissive polymeric layer 631 and second light transmissive polymeric layer 634 adhered to light transmissive support layer 621. The composite cube-corners on support layer are de-molded from roll 625, and then pass post-cure irradiation source 642, completing formation of retroreflective article 610 having composite cube-corner elements 635, which for convenience is wound onto a take-up roll.

In an alternate method of making a retroreflective article (not show), an apparatus having a molding tool onto which is selectively applied a first radiation curable resin is provided. In one embodiment, a flexographic printer is used to apply the first radiation curable resin in a desired pattern, partially filling at least a portion of the cube-corner cavities, forming partially filled partial cube-corner cavities and unfilled cube-corner cavities (i.e., cube-corner cavities that are not filled by the first radiation curable resin). As the molding tool rotates, the partially filled cube-corner cavities and the unfilled cube-corner cavities are contacted by a second radiation curable resin, different from the first radiation curable resin, which fills the partially filled partial cube-corner cavities and completely fills the unfilled cube-corner cavities, forming a composite. In some embodiments, the second radiation curable resin was coated from die onto a light transmissive support layer. In other embodiments, the second radiation curable resin was coated onto a carrier layer and the second radiation curable resin over-filled the cube-corner cavities, forming a land layer. The land layer may be cured to form a body layer contiguous with the base of the cube-corner elements, as was presented in FIG. 3 (see body layer 323). The carrier layer could later be removed from the finished article. In yet another alternate embodiment, the cavities may be over-filled with a second radiation curable resin to form a land layer and also have a light transmissive support layer overlaying the land layer. The composite passes a first irradiation source, forming composite cube-corners having first light transmissive polymeric layer and a second light transmissive polymeric layer, and monolithic cube-corners having a second light transmissive polymeric layer. In some embodiments the second light transmissive polymeric layer is adjacent a light transmissive support layer. In other embodiments the second light transmissive polymeric layer also formed a land layer. The first light transmissive polymeric layer and the second light transmissive polymeric layer of the composite cube-corners have, respectively, first index of refraction and second index of refraction, wherein the first and second indices of refraction have an absolute difference of at least 0.0002. The composite and the monolithic cube-corners, having a land layer and/or a light transmissive support layer, are de-molded from the molding tool, and then pass a post-cure irradiation source, completing formation of a retroreflective article having composite and monolithic cube-corner elements.

Figure 9:
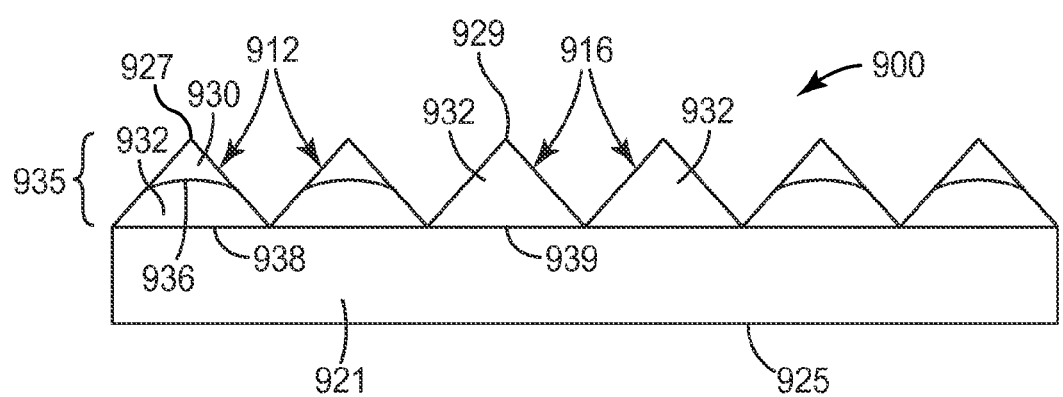
FIG. 9 is a schematic representation of a side view of a retroreflective article having a combination of composite cube-corner elements and monolithic cube-corner elements.

In an embodiment of an exemplary retroreflective article having an array of composite cube corner elements in combination with monolithic cube-corner elements, and as shown in FIG. 9, retroreflective sheeting 900 comprises light transmissive support layer 921 and plurality of composite cube-corner elements 912, each having apex 927 and base 938, and comprising first light transmissive polymeric layer 930 and second light transmissive polymeric layer 932. In the exemplary embodiment shown in FIG. 9, first light transmissive polymeric layer 930 comprises apex 927, and second light transmissive polymeric layer 932 comprises all of base 938. Typically, interface 936 is visually discernable between first light transmissive polymeric layer 930 and second light transmissive polymeric layer 932. Interface 936 is typically a curved surface, as shown. Retroreflective sheeting 900 also comprises monolithic cube-corner elements 916, comprising second light transmissive polymer 932 in both the apex and the base of monolithic cube corner elements 916.

Light transmissive support layer 921 may be secured to base 938 of composite cube-corner elements 912 and to the base of monolithic cube-corner elements 916, or it may be secured to the composite and monolithic cube-corner elements by a land layer (not shown). In some embodiments, the land layer is kept to a minimal thickness and is made from a high elastic modulus material.

In an alternate method of making a retroreflective article (not show), an apparatus having a molding tool onto which is selectively applied a first radiation curable resin is provided. In one embodiment, a flexographic printer is used to apply the first radiation curable resin in a desired pattern, partially filling at least a portion of the cube-corner cavities, forming partially filled partial cube-corner cavities and unfilled cube-corner cavities (i.e., cube-corner cavities that were not filled by the first radiation curable resin). As the molding tool rotates, cube-corner cavities pass a first irradiation source, and the first radiation curable resin is pre-cured forming pre-cured partial cube-corner structures. A second radiation curable resin (which may be the same as or different from first radiation curable resin) is then pressed into contact with the pre-cured partial cube-corner structures and the unfilled cube-corner cavities with a roll, forming a composite. In some embodiments, the second radiation curable resin was coated from die onto a light transmissive support layer. In other embodiments, the second radiation curable resin was coated onto a carrier layer and the second radiation curable resin over-filled the cube-corner cavities, forming a land layer. The carrier layer could later be removed from the finished article. In yet another alternate embodiment, the cavities may be over-filled with a second radiation curable resin to form a land layer and also have a light transmissive support layer overlaying the land layer. The composite passes a second irradiation source, forming composite cube-corners having first light transmissive polymeric layer and a second light transmissive polymeric layer, and monolithic cube-corners having a second light transmissive polymeric layer. In some embodiments the second light transmissive polymeric layer is adjacent a light transmissive support layer. In other embodiments the second light transmissive polymeric layer also formed a land layer. The composite and monolithic cube-corners, having a land layer and/or a light transmissive support layer, are de-molded from the molding tool, and then pass a post-cure irradiation source, completing formation of a retroreflective article having composite and monolithic cube-corner elements.

In some embodiments, the retroreflective article of the present disclosure comprises composite cube-corner elements and monolithic cube-corner elements. In some embodiments, the composite cube-corner elements create an optically variable mark. Methods for providing an optically variable mark in retroreflective articles are also described in U.S. Patent Application No. 61/491,602 (Attorney Docket No. 67604US002), entitled "CUBE CORNER SHEETING HAVING OPTICALLY VARIABLE MARKING", filed on the same date as the instant application, the disclosure of which is incorporated herein by reference.

Methods of the present disclosure can be used to make a variety of useful retroreflective articles (e.g., traffic signs, barricades, license plates, pavement markers and marking tape, as well as conspicuity marking for vehicles and clothing).

Embodiments

Item 1. A retroreflective article comprising:

a light transmissive support layer having generally opposed first and second major surfaces; and an array of composite cube-corner elements secured to the first major surface of the light transmissive support layer, wherein each composite cube-corner element comprises an apex and a base opposite the apex, and wherein each composite cube-corner element comprises a first light transmissive polymeric layer, a second light transmissive polymeric layer, and an interface therebetween;

wherein the first light transmissive polymeric layer comprises the apex, and the second light transmissive polymeric layer comprises at least a portion of the base, wherein the first light transmissive polymeric layer has a first index of refraction, wherein the second light transmissive polymeric layer has a second index of refraction, and wherein the first and second indices of refraction have an absolute difference of at least 0.0002.

Item 2. The retroreflective article of item 1, wherein the first index of refraction is greater than the second index of refraction.

Item 3. The retroreflective article of item 1, wherein the first index of refraction is less than the second index of refraction.

Item 4. The retroreflective article of item 1, wherein each of the composite cube-corner elements comprises up to 95% by volume of the second light transmissive polymeric layer.

Item 5. The retroreflective article of any of items 1 to 4, wherein the first index of refraction and the second index of refraction have an absolute difference of at least 0.001.

Item 6. The retroreflective article of any of items 1 to 4, wherein the first index of refraction and the second index of refraction have an absolute difference of at least 0.01.

Item 7. The retroreflective article of any of items 1 to 4, wherein the first index of refraction and the second index of refraction have an absolute difference of at least 0.1.

Item 8. The retroreflective article of any of items 1 to 4, wherein the first light transmissive polymeric layer and the second light transmissive polymeric layer each comprise a light transmissive polymeric material, and wherein the light transmissive polymeric material in the first light transmissive polymeric layer is a more highly irradiated form of the light transmissive material in the second light transmissive polymeric layer.

Item 9. A traffic sign that comprises a retroreflective article according to any one of items 1 to 8.

Item 10. A license plate that comprises a retroreflective article according to any one of items 1 to 8.

Item 11. A conspicuity film that comprises a retroreflective article according to any one of items 1 to 8.

Item 12. A method of making a retroreflective article, the method comprising:

providing a molding tool having a microstructured surface including a plurality of cavities;

partially filling the plurality of cavities with a first radiation curable resin, wherein the at least a portion of the plurality of cavities comprises a cube-corner geometry;

exposing the first radiation curable resin to a first irradiation to pre-cure the first radiation curable resin and provide pre-cured partial cube-corner structures;

contacting a second radiation curable resin onto the pre-cured partial cube-corner structures;

exposing the pre-cured partial cube-corner structures and the second radiation curable resin to a second irradiation to provide composite cube-corners on the surface of the molding tool; and separating the composite cube-corners from the surface of the molding tool.

Item 13. The method of item 12, further comprising bringing the second radiation curable resin into contact with a light transmissive support layer prior to the second irradiation, wherein the second irradiation passes through the light transmissive support layer.

Item 14. The method of item 12, wherein the light transmissive support layer comprises a material selected from the group consisting of film, fabric, and glass.

Item 15. The method of any one of items 12 to 14, wherein the molding tool is a micro-structured tool selected from the group consisting of a roll, a continuous belt, a film, and a metal plate.

Item 16. The method of any one of items 12 to 15, wherein the first and second irradiations each independently include actinic radiation.

Item 17. The method of any one of items 12 to 16, wherein the first radiation curable resin shrinks by at least 5 percent by volume when cured.

Item 18. The method of any one of items 12 to 17, wherein the first radiation curable resin shrinks in a range from 5 percent by volume to 20 percent by volume when cured.

Item 19. The method of any one of items 12 to 18, wherein the second radiation curable resin overfills the plurality of cavities and forms a land layer.

Item 20. The method of any one of items 12 to 19, wherein the molding tool is light-transmissive.

Item 21. The method of any one of items 12 to 20, wherein the first radiation curable resin and the second radiation curable resin are each independently selected from the group consisting of monofunctional, difunctional, and polyfunctional acrylates, and combinations thereof.

Item 22. The method of any one of items 12 to 21, wherein the first radiation curable resin and second radiation curable resin are the same as each other.

Item 23. A retroreflective article comprising:

a body layer having generally opposed first and second major surfaces; and an array of composite cube-corner elements on the first major surface of the body layer, wherein each composite cube-corner element comprises an apex and a base opposite the apex, wherein each composite cube-corner element comprises a first light transmissive polymeric layer, a second light transmissive polymeric layer, and an interface therebetween, wherein the first light transmissive polymeric layer comprises the apex, wherein the second light transmissive polymeric layer is contiguous with the body layer, wherein the first light transmissive polymeric layer has a first index of refraction, wherein the second light transmissive polymeric layer has a second index of refraction, and wherein the first and second indices of refraction have an absolute difference of at least 0.0002.

Item 24. The retroreflective article of item 23, wherein the first index of refraction is greater than the second index of refraction.

Item 25. The retroreflective article of item 23, wherein the first index of refraction is less than the second index of refraction.

Item 26. The retroreflective article of item 23, wherein each of the composite cube-corner elements comprises up to 95% by volume of the second light transmissive polymeric layer.

Item 27. The retroreflective article of any of items 23 to 26, wherein the first index of refraction and the second index of refraction have an absolute difference of at least 0.001.

Item 28. The retroreflective article of any of items 23 to 26, wherein the first index of refraction and the second index of refraction have an absolute difference of at least 0.01.

Item 29. The retroreflective article of any of items 23 to 26, wherein the first index of refraction and the second index of refraction have an absolute difference of at least 0.1.

Item 30. The retroreflective article of any of items 23 to 26, wherein the first light transmissive polymeric layer and the second light transmissive polymeric layer each comprise a light transmissive polymeric material, and wherein the light transmissive polymeric material in the first light transmissive polymeric layer is a more highly irradiated form of the light transmissive material in the second light transmissive polymeric layer.

Item 31. A traffic sign that comprises a retroreflective article according to any one of items 23 to 30.

Item 32. A license plate that comprises a retroreflective article according to any one of items 23 to 30.

Item 33. A conspicuity film that comprises a retroreflective article according to any one of items 23 to 30.

Item 34. A method of making a retroreflective article, the method comprising:

providing a molding tool having a microstructured surface including a plurality of cube-corner cavities;

applying a first radiation curable resin to a portion of the cube-corner cavities in a desired pattern, partially filling a portion of the cube-corner cavities and forming partially filled cube corner cavities and unfilled cube-corner cavities;

contacting the partially filled cube corner cavities and unfilled cube-corner cavities with a second radiation curable resin, wherein the second radiation curable resin is different from the first radiation curable resin, forming a composite;

exposing the composite to an irradiation source to provide composite cube-corners and monolithic cube-corners on the surface of the molding tool; and separating the composite cube-corners and monolithic cube-corners from the surface of the molding tool.

Item 35. A method of making a retroreflective article, the method comprising:

providing a molding tool having a microstructured surface including a plurality of cube-corner cavities;

applying a first radiation curable resin to a portion of the cube-corner cavities in a desired pattern, partially filling a portion of the cavities and forming partially filled cube corner cavities and unfilled cube-corner cavities;

exposing the composite to a first irradiation to provide pre-cured partial cube-corner structures;

contacting the pre-cured partial cube-corner structures and unfilled cube-corner cavities with a second radiation curable resin, forming a composite;

exposing the composite to a second irradiation to provide composite cube-corners and monolithic cube-corners on the surface of the molding tool; and separating the composite cube-corners and monolithic cube-corners from the surface of the molding tool.

Item 36. A retroreflective article comprising:

a light transmissive support layer having generally opposed first and second major surfaces; and an array of composite cube-corner elements and monolithic cube-corner elements secured to the first major surface of the light transmissive support layer, each cube-corner element comprising an apex and a base opposite the apex;

wherein each composite cube-corner element comprises a first light transmissive polymeric layer comprising the apex, the first light transmissive polymeric layer having a first index of refraction, and a second light transmissive polymeric comprising at least a portion of the base, the second light transmissive polymeric layer having a second index of refraction, and wherein the first and second indices of refraction have an absolute difference of at least 0.0002.

Item 37. The retroreflective article of item 36, wherein the monolithic cube-corner elements comprise the second light transmissive polymeric layer.

Item 38. The retroreflective article of any of items 36 or 37, wherein the second light transmissive polymeric layer is different from the first light transmissive polymeric layer.

Item 39. The retroreflective article any of items 36 to 38, wherein the composite cube-corner elements form an optically variable mark.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

Test Methods

Measuring Brightness at Various Observation Angles

The coefficient of retroreflection, $R_A$ was measured following the procedure outlined in ASTM E-810-03 "Test Method for Coefficient of Retroreflection of Retroreflective Sheeting Utilizing the Coplanar Geometry" (approved February, 2008), incorporated herein by reference. $R_A$ was measured at discrete observation angles and averaged over the annular region between two adjacent measured observation angles.

Measuring Fractional Retroreflectance and Fractional Retroreflectance Slope

Incremental % $R_T$ for a given observation angle was determined by multiplying the averaged $R_A$ by the area of the annular region divided by the cosine of the entrance angle. Fractional retroreflectance % $R_T$ was calculated as the sum of incremental % $R_T$ for observation angles between 0 and the observation angle of interest ($\alpha[max]$). Fractional retroreflectance slope for a given observation angle was the incremental % $R_T$ divided by the difference between the adjacent observation angles.

Materials

| | |
|---|---|
| BAED | bisphenol-A epoxy diacrylate obtained from Cytec Industries Inc., Smyrna, GA, under the trade designation "EBECRYL 3720". |
| DMAEA | Dimethylaminoethyl acrylate, obtained from Cytec Industries Inc. |
| EAA | Ethylene acid acrylate, obtained from Dow Company, Midland, MI, under the trade designation "PRIMACOR 3340". |
| HDDA | 1,6-hexanediol diacrylate, obtained from Cytec Industries Inc. |
| HMP/TPO | Blend of 2-hydroxy-2-methyl-1-phenyl propan-1-one and 2,4,6-trimethyl-benzoyldiphenylphosphine oxide (TPO), obtained from BASF Corporation, Florham Park, NJ, under the trade designation "DAROCUR 4265" |
| TMPTA | Trimethylolpropane triacrylate, obtained from Cytec Industries Inc. |
| TPO | (2,4,6 trimethylbenzoyl) diphenylphosphine oxide, a photoinitiator, obtained from Sigma-Aldrich, St. Louis, MO. |

Preparation of Composition 1

A first radiation-curable resin (Composition 1) was prepared by combining 25 wt. % BAED, 12 wt. % DMAEA, 38 wt. % TMPTA, 25 wt. % HDDA, and 0.5 pph (parts per hundred) TPO.

Preparation of Composition 2

A second radiation curable resin (Composition 2) was prepared by mixing 90 wt. % of Composition 1 with 10 wt. % of BAED.

Preparation of Composition 3

A third radiation curable resin (Composition 3) was prepared by mixing 50 wt. % of TMPTA, 25 wt. % of HDDA, 25 wt. % of BAED, and 1 pph of HMP/TPO.

Illustrative Examples 1-3

Illustrative Examples 1-3 were prepared by coating a film of a given composition at a thickness of about 3 mil (75 micrometers) onto a first polyester terephthalate (PET) film. Pre-cured films were prepared by irradiating the coated films for about 15 seconds using an array of light emitting diode (LED) lamps (obtained as Model "LN 120-395B-120" from Clearstone Technologies, Minneapolis, Minn.), emitting in the 395 nanometer wavelength range and having an energy output level at a 100% power setting of about 170 milliwatts per square centimeter (mW/cm$^2$). A second 3 mil (75 micrometers) thick layer of the same composition was then coated onto the partially cured coated film. A second PET film was placed over the second layer to form a composite, and the composite was irradiated through the second PET film with two Fusion "D" UV lamps (obtained from Fusion Systems, Rockville, Md.) set at 600 Watts per square inch (W/in$^2$) for about 15 seconds. Dichroic filters were used in front of the UV lamps. Both the first and the second PET films were then removed from the composite.

Refractive indices of Illustrative Examples 1-3 were measured on each major side of the composite using a refractometer (obtained as Model 2010/M from Metricon Corporation, Pennington, N.J.) equipped with a laser diode control unit set at 404 nm (obtained from Power Technology, Little Rock, Ark.). Compositions and refractive indices for each major side of the composites of Illustrative Examples 1-3 are reported in Table 1, below.

TABLE 1

| Illustrative Example | Radiation Curable Resin | Refractive Index | |
|---|---|---|---|
| | | LED-cured side | UV-cured side |
| 1 | Composition 1 | 1.5239 | 1.5228 |
| 2 | Composition 2 | 1.5266 | 1.5242 |
| 3 | Composition 3 | 1.5246 | 1.5209 |

Comparative Example A

Comparative Example A was a white retroreflective sheeting was obtained from 3M Company, St. Paul, Minn., under the trade designation "3M ENGINEER GRADE REFLECTIVE SHEETING 3290".

Example 4

The following description for the preparation of Example 4 refers to apparatus 600 as generally shown in FIG. 6. An overlay film 621 was made by extruding an EAA film at a thickness of 0.01 cm (4 mil) onto a corona treated polyethylene terephthalate (PET) carrier film 628. Pellets of EAA were fed into a 1.9 cm (0.75 in.) single screw extruder (obtained from C.W. Brabender Instruments Inc., South Hackensack, N.J.) with temperatures set at 140° C. (284° F.) for zone 1 and ramped up to 175° C. (347° F.) at the extruder exit and die, resulting in a melt temperature of about 175° C. (347° F.). As the molten resin exited the extruder, it passed through a conventional horizontal film die (obtained from Extrusion Dies Industries LLC, Chippewa Falls, Wis., under the trade designation "ULTRAFLEX-40") and was cast onto the PET carrier film 628. The PET carrier film 628 was traveling at about 36 meters/min (120 ft/min) The resulting molten overlay film 621 on the PET carrier film 628 was run between a rubber roll/chilled steel roll nip to solidify the molten resin into a layer. The EAA surface was corona treated at an energy level of about 1.0 J/cm$^2$.

A first portion of Composition 1 (630) was extruded and passed through a first die 650 which was brought into close proximity to a first rubber roll 624. The rubber roll 624 ran in a clockwise motion and nipped against a molding tool 625 heated to 180° F. (82° C.) containing a plurality of cube-corner cavities 627. The molding tool 625 was mounted on a mandrel rotating in a counterclockwise motion at about 75 fpm (22.8 m/min) Composition 1 (630) partially filled the cube-corner cavities to about 60% in volume, providing partially filled partial cube-corner structures 631. The partially filled partial cube-corner structures 631 were then pre-cured with the array of light emitting diodes (LEDs) 640 placed about 1.2 inch (3 cm) from the molding tool 625. The array of LEDs 640 was controlled by a controller (obtained as Model CF2000 from Clearstone Technologies) (not shown), at a controller power setting of 10%. The overlay film 621 was drawn along from a supply roll 622 with the EAA side facing upward. A second portion of Composition 1 (632) was simultaneously cast through a second die 652 onto a second rubber roll 624. The second rubber roll 624 contacted the EAA side of the overlay film 621, transferring the second portion of the Composition 1 (632) onto the overlay film. The coated overlay film was brought in contact with the molding tool 625 containing the partially filled, pre-cured cube-corner structures 631 via a third silicone-coated rubber roll 623. The resin coated on the overlay film completely filled the unfilled portion of the cube-corner cavities, and the composite construction was cured through the overlay film 621 to form a retroreflective film article 634, using two Fusion "D" lamps 641 (Fusion Systems) set at 600 W/in., and also using dichroic filters (not shown) in front of the UV lamps. The retroreflective film 634 was separated from the molding tool 625 and then was irradiated by a Fusion "D" UV lamp 642 operating at 100% to provide a post-UV irradiation cure through the composite cube-corner structures 635. The retroreflective film 634 was then passed through an oven set at 127° C. (260° F.).

The resulting cube-corner structures 635 had three sets of intersecting grooves with a pitch of 3.2 mils (81 micrometers). The intersecting grooves formed a cube-corner base triangle with included angles of 61° and a cube-corner element height of 1.95 mil (50 micrometers). The primary groove spacing is defined as the groove spacing between the grooves which form the two 61° base angles of the base triangle.

Example 5

Example 5 was prepared as described in Example 4, except that a controller power setting of 25% was used.

Example 6

Example 6 was prepared as described in Example 4, except that a controller power setting of 50% was used.

Example 7

Example 7 was prepared as described in Example 4, except that a controller power setting of 90% was used.

Comparative Example B

Comparative Example B was prepared as described in Example 4, except that a controller power setting of 0% was used (i.e., no pre-cure of the partially filled partial cube-corner structures 631 was performed).

Retroreflectivity ($R_A$) values for Comparative Examples A-B and Examples 4-7 were measured at an observation angle of 0.2 degrees, entrance angle of –4 degrees, and orientation of 0 degrees. Results are shown in Table 2, below (the controller power setting for LEDS was not applicable (N/A) for Comparative Example A, which was tested as obtained).

TABLE 2

| Examples | Controller Power Setting for LEDs (%) | $R_A$ (cd/lux · m$^2$) |
|---|---|---|
| Comparative Example A | N/A | 90 |
| Comparative Example B | 0 | 922.7 |
| Example 4 | 10 | 897.1 |
| Example 5 | 25 | 730.1 |
| Example 6 | 50 | 653.2 |
| Example 7 | 90 | 622.1 |

Example 8

Example 8 was prepared as described in Example 4, except that a controller power setting of 25% was used.

Example 9

Example 9 was prepared as described in Example 4, except that a controller power setting of 50% was used.

Example 10

Example 10 was prepared as described in Example 4, except that a controller power setting of 75% was used.

Example 11

Example 11 was prepared as described in Example 4, except that a controller power setting of 100% was used.

Figure 7:
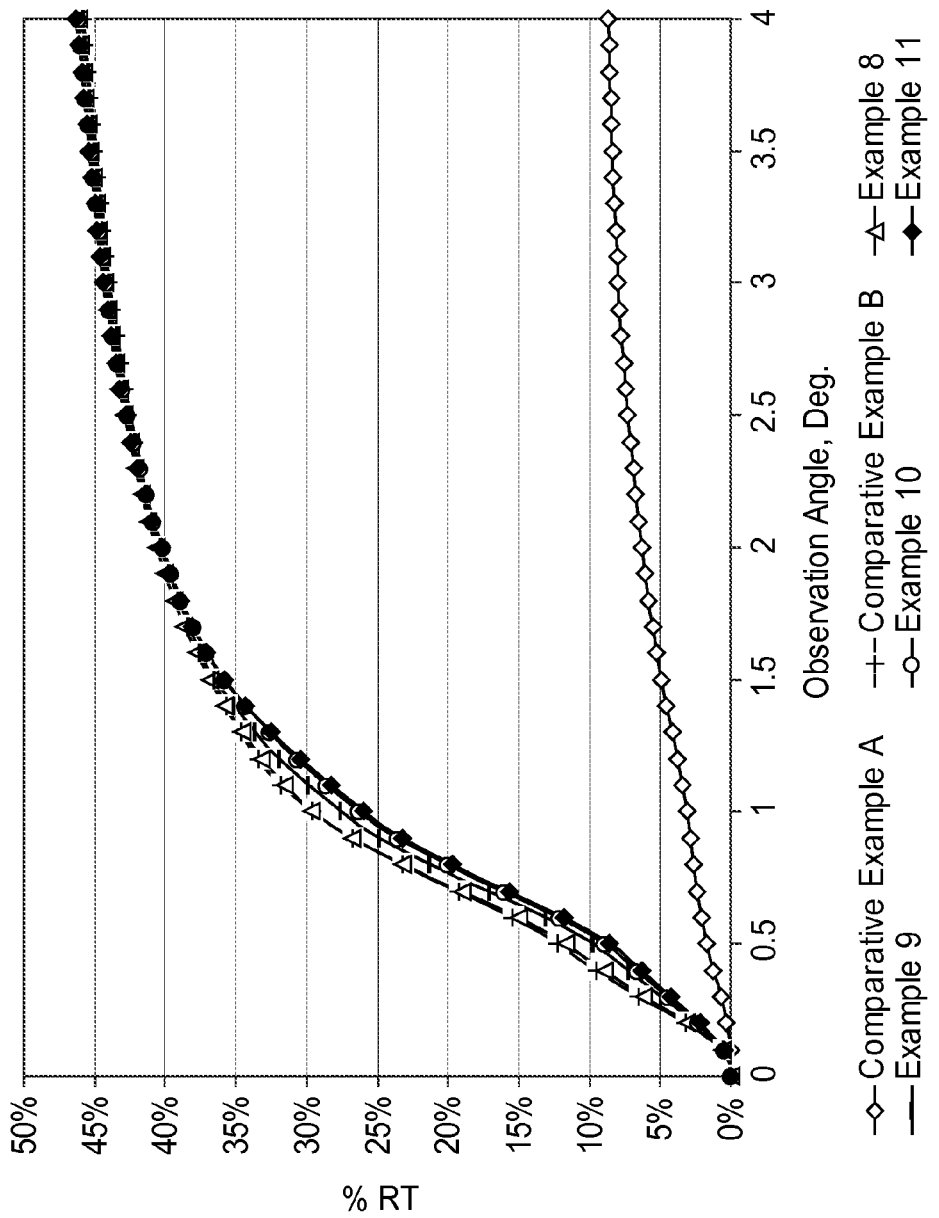
FIG. 7 is a graphical representation of Percent Light Retention (% $R_T$) versus Observation Angle for exemplary retroreflective articles described herein.
Figure 8:
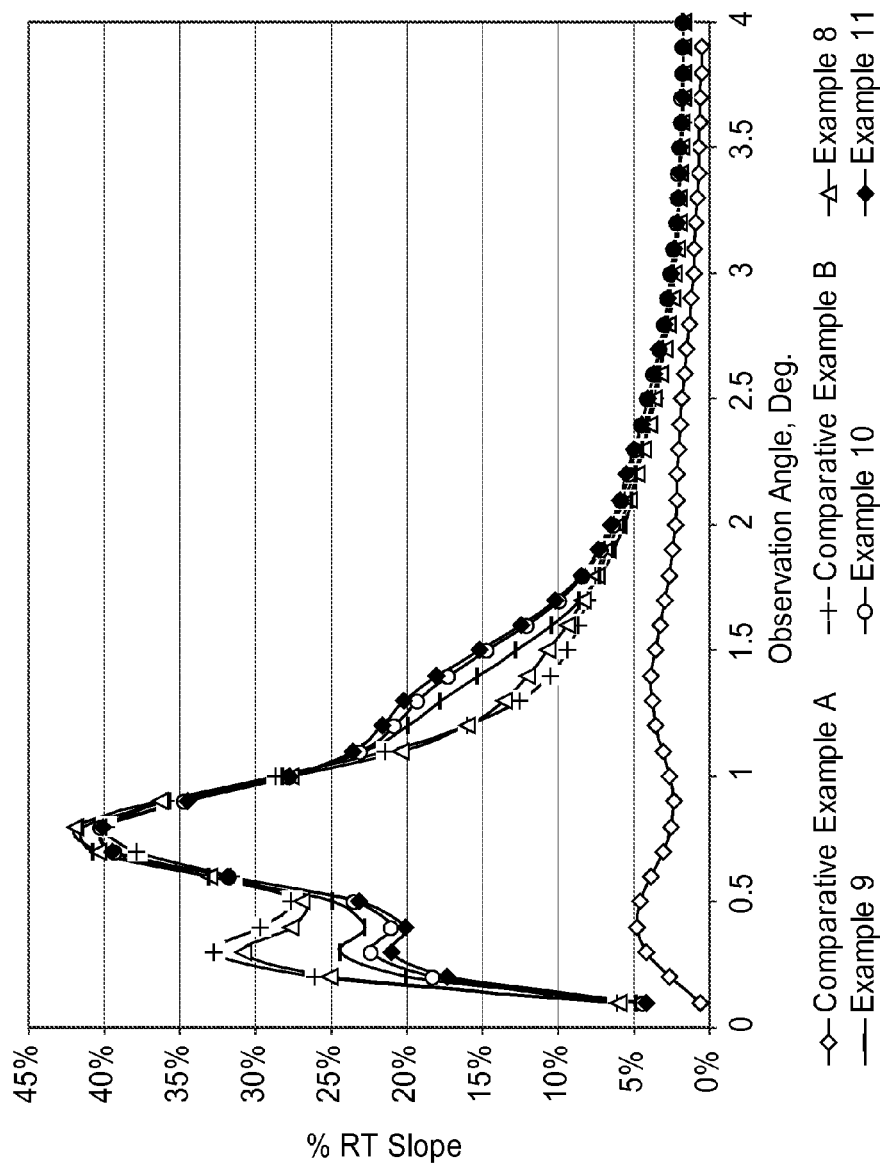
FIG. 8 is a graphical representation of Percent Light Retention slope (% $R_T$ slope) versus Observation Angle for exemplary retroreflective articles described herein.

FIGS. 7 and 8, respectively, show % RT and % RT Slope values for Comparative Examples A and B, and Examples 8-11.

Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. A retroreflective article comprising:
   a light transmissive support layer having generally opposed first and second major surfaces; and
   an array of composite cube-corner elements secured to the first major surface of the light transmissive support layer, wherein each composite cube-corner element comprises an apex and a base opposite the apex, and wherein each composite cube-corner element comprises a first light transmissive polymeric layer, a second light transmissive polymeric layer, and an interface therebetween;
   wherein the first light transmissive polymeric layer comprises the apex, and the second light transmissive polymeric layer comprises at least a portion of the base,
   wherein the first light transmissive polymeric layer has a first index of refraction,
   wherein the second light transmissive polymeric layer has a second index of refraction, wherein the first and second indices of refraction have an absolute difference of at least 0.0002, wherein the first light transmissive polymeric layer and the second light transmissive polymeric layer in the composite cube-corner elements are configured to divert retroreflected light to higher observation angles than in monolithic cube-corner elements of comparable geometry and materials, and wherein each of the composite cube-corner elements comprises up to 95% by volume of the second light transmissive polymeric layer.

2. The retroreflective article of claim 1, wherein the first index of refraction and the second index of refraction have an absolute difference of at least 0.001.

3. The retroreflective article of claim 1, wherein the first light transmissive polymeric layer and the second light transmissive polymeric layer each comprise a light transmissive polymeric material, and wherein the light transmissive polymeric material in the first light transmissive polymeric layer is a more highly irradiated form of the light transmissive material in the second light transmissive polymeric layer.

4. A traffic sign that comprises a retroreflective article according to claim 1.

5. A license plate that comprises a retroreflective article according to claim 1.

6. A conspicuity film that comprises a retroreflective article according to claim 1.

7. The article of claim 1, wherein the composite cube-corner elements form an optically variable mark.

8. A retroreflective article comprising:
   a body layer having generally opposed first and second major surfaces; and
   an array of composite cube-corner elements on the first major surface of the body layer, wherein each composite cube-corner element comprises an apex and a base opposite the apex, wherein each composite cube-corner element comprises a first light transmissive polymeric layer, a second light transmissive polymeric layer, and an interface therebetween, wherein the first light transmissive polymeric layer comprises the apex, wherein the second light transmissive polymeric layer is contiguous with the body layer, wherein the first light transmissive polymeric layer has a first index of refraction,
   wherein the second light transmissive polymeric layer has a second index of refraction, wherein the first and second indices of refraction have an absolute difference of at least 0.0002, wherein the first light transmissive polymeric layer and the second light transmissive polymeric layer in the composite cube-corner elements are configured to divert retroreflected light to higher observation angles than in monolithic cube-corner elements of comparable geometry and materials, and wherein each of the composite cube-corner elements comprises up to 95% by volume of the second light transmissive polymeric layer.

9. The retroreflective article of claim 8, wherein the first index of refraction and the second index of refraction have an absolute difference of at least 0.001.

10. The retroreflective article of claim 8, wherein the first light transmissive polymeric layer and the second light transmissive polymeric layer each comprise a light transmissive polymeric material, and wherein the light transmissive polymeric material in the first light transmissive polymeric layer is a more highly irradiated form of the light transmissive material in the second light transmissive polymeric layer.

11. A traffic sign that comprises a retroreflective article according to claim 8.

12. A license plate that comprises a retroreflective article according to claim 8.

13. A conspicuity film that comprises a retroreflective article according to claim 8.

14. The article of claim 8, wherein the composite cube-corner elements form an optically variable mark.

15. A method of making a retroreflective article, the method comprising:

providing a molding tool having a microstructured surface including a plurality of cube-corner cavities;

applying a first radiation curable resin to a portion of the cube-corner cavities in a desired pattern, partially filling a portion of the cavities and forming partially filled cube corner cavities and unfilled cube-corner cavities;

exposing the first radiation curable resin to a first irradiation to provide pre-cured partial cube-corner structures;

contacting the pre-cured partial cube-corner structures and unfilled cube-corner cavities with a second radiation curable resin, forming a composite;

exposing the composite to a second irradiation to provide composite cube-corners and monolithic cube-corners on the surface of the molding tool; and separating the composite cube-corners and monolithic cube-corners from the surface of the molding tool.

16. The method of claim 15, further comprising bringing the second radiation curable resin into contact with a light transmissive support layer prior to the second irradiation.

* * * * *